(12) United States Patent
Ishiguro et al.

(10) Patent No.: US 7,298,842 B2
(45) Date of Patent: Nov. 20, 2007

(54) UTILIZING A KEY FOR ENCIPHERING AND DECIPHERING THAT IS MODIFIED DURING ENCIPHERING AND DECIPHERING

(75) Inventors: Ryuji Ishiguro, Tokyo (JP); Yoshitomo Osawa, Kanagawa (JP); Yoshio Osakabe, Kanagawa (JP); Makoto Sato, Tokyo (JP); Hisato Shima, Saratoga (JP); Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 09/872,509

(22) Filed: Jun. 1, 2001

(65) Prior Publication Data

US 2003/0191956 A1 Oct. 9, 2003

Related U.S. Application Data

(63) Continuation of application No. 09/059,776, filed on Apr. 14, 1998, now Pat. No. 6,256,391.

(30) Foreign Application Priority Data

Apr. 23, 1997 (JP) ............................... P09-106136

(51) Int. Cl.
*H04L 9/00* (2006.01)
*H04N 7/167* (2006.01)

(52) U.S. Cl. .................. 380/44; 380/201; 713/189

(58) Field of Classification Search ........ 380/201–203, 380/44–46, 239, 277–278; 713/189; 705/59
See application file for complete search history.

(56) References Cited

U.S. PATENT DOCUMENTS 4,203,166 A 5/1980 Ehrsam et al.

(Continued)

FOREIGN PATENT DOCUMENTS

EP 0 756 276 1/1997

(Continued)

OTHER PUBLICATIONS

Schneier Bruce: "Applied Cryptography Second Edition: protocols, algorithms, and source code in C" 1996, John Wiley & Sons, USA XP002104180, pp. 180-181; 265-301; 30-31; 429-459 and 351-354.

(Continued)

*Primary Examiner*—Hosuk Song
(74) *Attorney, Agent, or Firm*—Frommer Lawrence & Haug LLP; William S. Frommer

(57) ABSTRACT

The invention provides an enciphering apparatus and method, a deciphering apparatus and method and an information processing apparatus and method by which illegal copying can be prevented with certainty. Data enciphered by a 1394 interface of a DVD player is transmitted to a personal computer and a magneto-optical disk apparatus through a 1394 bus. In the magneto-optical disk apparatus with which a change to a function is not open to a user, the received data is deciphered by a 1394 interface. In contrast, in the personal computer with which a change to a function is open to a user, the enciphered data is deciphered using a time variable key by a 1394 interface, and a result of the decipherment is further deciphered using a session key by an application section.

52 Claims, 22 Drawing Sheets

U.S. PATENT DOCUMENTS

| | | | |
|---|---|---|---|
| 4,531,021 A | | 7/1985 | Bluestein et al. ........ 178/22.08 |
| 5,029,207 A | * | 7/1991 | Gammie ..................... 380/228 |
| 5,341,425 A | | 8/1994 | Wasilewski et al. .......... 380/20 |
| 5,425,103 A | | 6/1995 | Shaw .......................... 380/44 |
| 6,105,012 A | | 8/2000 | Chang et al. |
| 6,256,391 B1 | * | 7/2001 | Ishiguro et al. ............. 380/203 |
| 6,539,094 B1 | | 3/2003 | Osakabe et al. |

FOREIGN PATENT DOCUMENTS

| | | |
|---|---|---|
| EP | 0 765 061 | 3/1997 |

OTHER PUBLICATIONS

"Encryption for Open VMS, Version 1.3" Digital Software Product Descriptions, Updated: Apr. 30, 1996, Retrieved From Internet: May 27, 1999 Via http://www.Digital.com/Info/SP2674, XP002104179, the whole document.

Schneier Bruce: "Applied Cryptography Second Edition: protocols, algorithms, and source code in C" 1996, John Wiley & Sons, USA XP002104180.

"Encryption for Open VMS, Version 1.3" Digital Software Product Descriptions, Updated: Apr. 30, 1996, Retrieved from Internet: May 27, 1999 Via http://www.Digital.com/info/SP2674, XP002104179.

Schneier Bruce: "Applied Cryptography Second Edition: protocols, algorithms, and source code in C" 1996, John Wiley & Sons, USA XP002104588.

Bloks R.H.J., "The IEEE—1394 High Speed Serial Bus", Philips Journal of Research, vol. 50, No. 1, Jan. 1, 1996; pp. 209-216.

Kunzman A.J. et al., "1394 High Performance Serial Bus: The Digital Interface for ATV", IEEE Transactions on Consumer Electronics, vol. 41, No. 3; Aug. 1, 1995; pp. 893-900.

* cited by examiner

F I G. 2
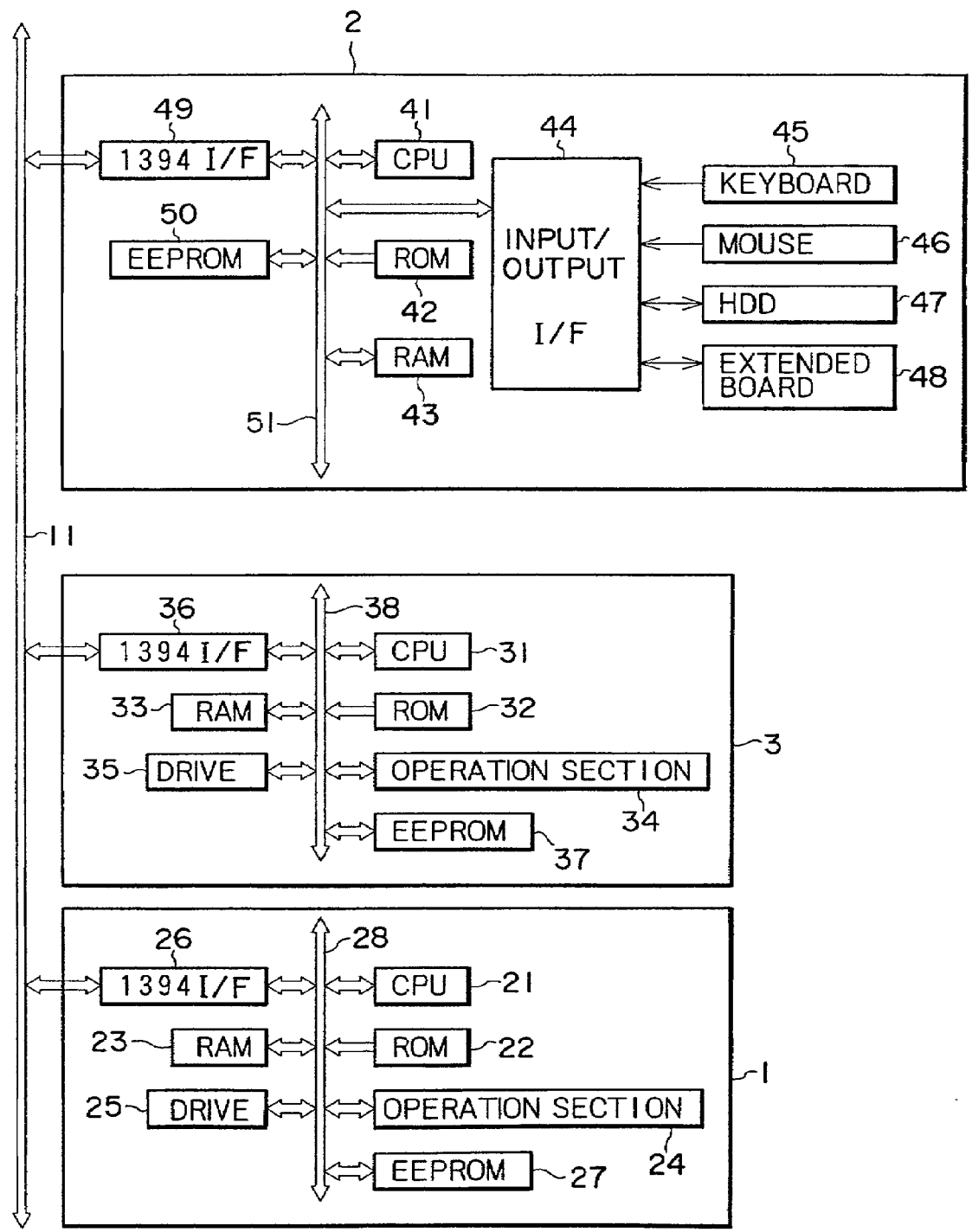

LFSR72

LFSR72

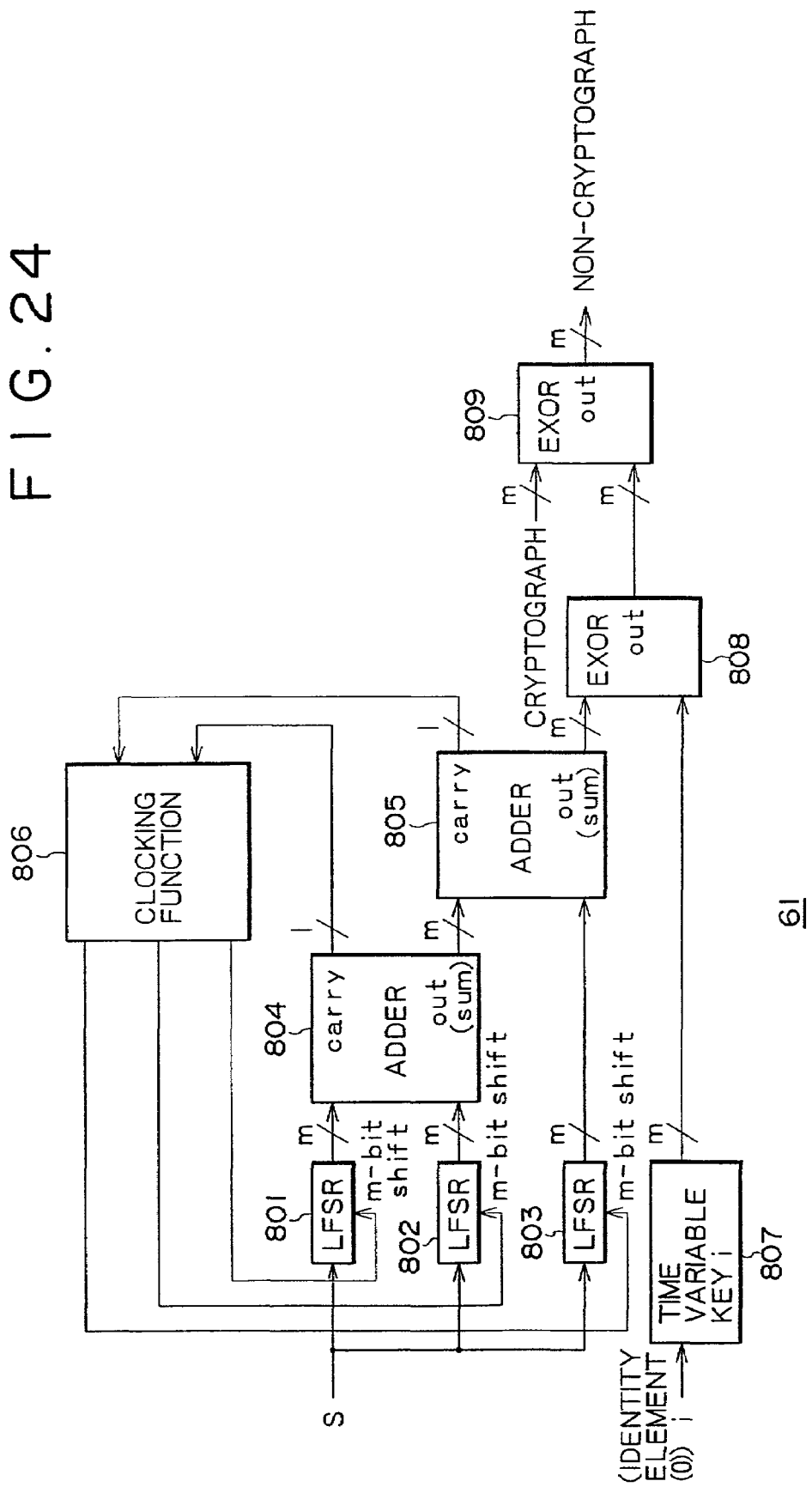

UTILIZING A KEY FOR ENCIPHERING AND DECIPHERING THAT IS MODIFIED DURING ENCIPHERING AND DECIPHERING

Continuation of prior application Ser. No. 09/059,776, filed Apr. 14, 1998 now U.S. Pat. No. 6,256,391.

BACKGROUND OF THE INVENTION

1. Field of the Invention

This invention relates to an enciphering apparatus and method, a deciphering apparatus and method and an information processing apparatus and method, and more particularly to an enciphering apparatus and method, a deciphering apparatus and method and an information processing apparatus and method by which high security is assured.

2. Description of the Related Art

Recently, a network is available which is composed of a plurality of electronic apparatus represented by AV apparatus, computers and so forth which are connected to each other by a bus so that various data may be communicated between them.

Where a network of the type mentioned is employed, for example, data of a movie reproduced from a DVD (Digital Video Disk or Digital Versatile Disk) by a DVD player connected to the network can be transferred through the bus to and displayed by a display unit such as a television receiver or a monitor. Usually, it is licensed from the proprietor of copyright at a point of time when a DVD is purchased to display and enjoy a movie reproduced from the DVD on a display unit.

However, it is not usually licensed from the proprietor of copyright to copy data reproduced from the DVD onto another recording medium and utilize the same. Thus, in order to prevent data sent out through the bus (network) from being copied illegally, it is a possible idea to encipher the data on the sending side and decipher the data on the receiving side.

However, consumer electronics apparatus (CE apparatus) such as DVD players and television receivers are normally designed and produced for predetermined objects and are each produced such that it is impossible for a user to modify it or incorporate a different part into it to acquire or alter internal data (change of functions) of the apparatus. On the other hand, for example, in regard to personal computers, the architecture or circuitry is open to the public, and it is possible to add a board or install various application software to add or alter various functions.

Accordingly, in regard to a personal computer, it can be performed comparatively readily to directly access or alter data on an internal bus of the personal computer by adding predetermined hardware or applying a software program. This signifies that, by producing and applying application software, it can be performed readily, for example, to receive data transmitted as ciphered data from a DVD player to a television receiver and decipher or copy the received data by a personal computer.

In other words, a personal computer has a weak connection between a link portion which effects communication via a bus and an application portion which prepares data to be transmitted and utilizes received data, and includes many portions which can be modified physically and logically by a user. In contrast, a CE apparatus has a strong connection between them and includes little portion which allows intervention of a user.

SUMMARY OF THE INVENTION

It is an object of the present invention to provide an enciphering apparatus and method, a deciphering apparatus and method and an information processing apparatus and method by which illegal copying of data can be prevented with a higher degree of certainty.

In order to attain the object described above, according to an aspect of the present invention to provide an enciphering apparatus, comprising enciphering means for enciphering data using a cryptographic key, first generating means for generating a first key, second generating means for generating a second key which is changed at a predetermined timing while the data is enciphered, and producing means for producing the cryptographic key using the first key and the second key.

According to another aspect of the present invention, there is provided an enciphering method, comprising the steps of enciphering data using a cryptographic key, generating a first key, generating a second key which is changed at a predetermined timing while the data are enciphered, and producing the cryptographic key using the first key and the second key.

With the enciphering apparatus and the enciphering method, since a cryptographic key is produced using a first key and a second key which is changed at a predetermined timing while data is enciphered, encipherment can be performed with a high degree of security.

According to a further aspect of the present invention, there is provided a deciphering apparatus, comprising receiving means for receiving enciphered data, deciphering means for deciphering the received data using a cryptographic key, first generating means for generating a first key, second generating means for generating a second key which is changed at a predetermined timing while the data is deciphered, and producing means for producing the cryptographic key using the first key and the second key.

According to a still further aspect of the present invention, there is provided a deciphering method, comprising the steps of receiving enciphered data, deciphering the received data using a cryptographic key, generating a first key, generating a second key which is changed at a predetermined timing while the data is deciphered, and producing the cryptographic key using the first key and the second key.

With the deciphering apparatus and the deciphering method, since a cryptographic key is produced using a first key and a second key which is changed at a predetermined timing while data is deciphered, enciphered data can be deciphered with a higher degree of security.

According to a yet further aspect of the present invention, there is provided an information processing system, comprising a plurality information processing apparatus connected to each other by a bus, the information processing apparatus including first information processing apparatus each having a function whose change is not open to a user, and second information processing apparatus each having a function whose change is open to a user, each of the first information processing apparatus including first receiving means for receiving enciphered data, first deciphering means for deciphering the data received by the first receiving means using a cryptographic key, first generating means for generating a first key, second generating means for generating a second key which is changed at a predetermined timing while the data is deciphered, and first producing means for producing the cryptographic key using the first key generated by the first generating means and the second key generated by the second generating means, each of the second information processing apparatus including second receiving means for receiving enciphered data, third generating means for generating the first key, fourth generating means for generating the second key which is changed at a predetermined timing while the data is deciphered, second producing means for producing a first cryptographic key using one of the first key generated by the third generating means and the second key generated by the fourth generating means, third producing means for producing a second cryptographic key using the other of the first key generated by the third generating means and the second key generated by the fourth means, second deciphering means for deciphering the enciphered data received by the receiving means using the first cryptographic key, and third deciphering means for further deciphering the data deciphered by the second deciphering means using the second cryptographic key.

According to a yet further aspect of the present invention, there is provided an information processing method for an information processing system composed of a plurality information processing apparatus connected to each other by a bus, the information processing apparatus including first information processing apparatus each having a function whose change is not open to a user, and second information processing apparatus each having a function whose change is open to a user, comprising the steps performed by each of the first information processing apparatus of receiving enciphered data, deciphering the data received in the receiving step using a cryptographic key, generating a first key, generating a second key which is changed at a predetermined timing while the data is deciphered, and producing the cryptographic key using the first key generated in the first generating step and the second key generated in the second generating step, and the steps performed by each of the second information processing apparatus of receiving enciphered data, generating the first key, generating the second key which is changed at a predetermined timing while the data is deciphered, producing a first cryptographic key using one of the first key and the second key, producing a second cryptographic key using the other of the first key and the second key, deciphering the enciphered data received in the receiving step using the first cryptographic key, and deciphering the deciphered data further using the second cryptographic key.

With the information processing system and the information processing method, since, in the first information processing apparatus which have functions whose change is not open to a user, a cryptographic key is produced using a first key and a second key which is changed at a predetermined timing while data is deciphered, but in the second information processing apparatus which have functions whose change is open to a user, a first cryptographic key is produced using one of a first key and a second key which is changed at a predetermined timing while data is deciphered, and then a second cryptographic key is produced using the other, whereafter the enciphered data is deciphered using the first cryptographic key, and the deciphered data is further deciphered using the second cryptographic key, the information processing apparatus and method has a higher degree of reliability than ever.

According to a yet further aspect of the present invention, there is provided an information processing apparatus, comprising receiving means for receiving data transmitted thereto through a bus, producing means composed of a software program for producing a first cryptographic key and a second cryptographic key which is changed at a predetermined timing while the data is deciphered from the data received by the receiving means, first deciphering means for deciphering the enciphered data received by the receiving means using one of the first cryptographic key and the second cryptographic key produced by the producing means, and second deciphering means for deciphering and processing the data deciphered by the first deciphering means further using the other of the first cryptographic key and the second cryptographic key produced by the producing means.

According to a yet further aspect of the present invention, there is provided an information processing method, comprising the steps of receiving data transmitted thereto through a bus, producing, from the received data, a first cryptographic key and a second cryptographic key which is changed at a predetermined timing while the data is deciphered, deciphering the received enciphered data using one of the first cryptographic key and the second cryptographic key, and deciphering the deciphered data further using the other of the first cryptographic key and the second cryptographic key.

With the information processing apparatus and the information processing method, since a first cryptographic key and a second cryptographic key which is changed at a predetermined timing while data is deciphered are produced based on a software program, decipherment can be performed for each application program, and illegal copying can be prevented with a higher degree of accuracy.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a block diagram showing an example of internal constructions of a DVD player, a personal computer and a magneto-optical disk apparatus shown in FIG. 1;

FIG. 24 is a block diagram showing another example of the construction of the application section used in the enciphering procedure of FIG. 10.

DESCRIPTION OF THE PREFERRED EMBODIMENTS

Figure 1:
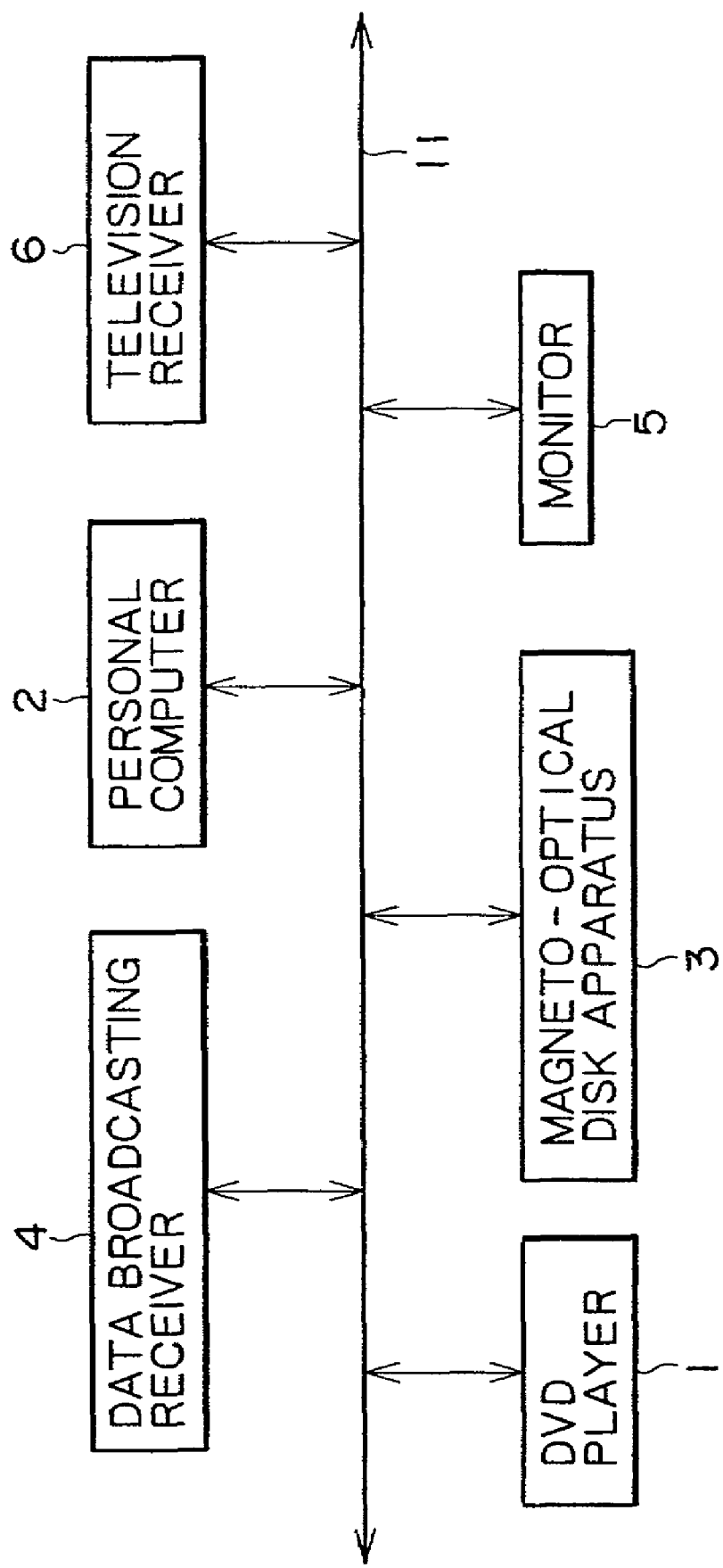
FIG. 1 is a block diagram showing an example of a construction of an information processing system to which the present invention is applied.

Referring first to FIG. 1, there is shown an exemplary information processing system to which the present invention is applied. The information processing system shown includes a DVD player 1, a personal computer 2, an magneto-optical disk apparatus 3, a data broadcasting receiver 4, a monitor 5 and a television receiver 6 all connected to each other by an IEEE 1394 serial bus 11.

Referring now FIG. 2, there are shown more detailed internal constructions of the DVD player 1, personal computer 2 and magneto-optical disk apparatus 3 of the information processing system shown in FIG. 1. The DVD player 1 is connected to the 1394 bus 11 by a 1394 interface 26. The DVD player 1 includes a CPU 21 which executes various processes in accordance with programs stored in a ROM 22. A RAM 23 is used to suitably stores data, programs and so forth necessary for the CPU 21 to execute various processes. An operation section 24 is formed from buttons, switches, a remote controller and so forth, and when it is operated by a user, it outputs a signal corresponding to the operation. A drive 25 drives a DVD not shown to reproduce data recorded on the DVD. An EEPROM (Electrically Erasable Programmable Read only Memory) 27 stores information such as key information which must remain stored also after the power supply to the apparatus is turned off. An internal bus 28 connects the components to each other.

The magneto-optical disk apparatus 3 includes a CPU 31, a ROM 32, a RAM 33, an operation section 34, a drive 35, a 1394 interface 36, an EEPROM 37 and an internal bus 38 which have similar functions to those of the DVD player 1 described above. Here, description of the similar components is omitted to avoid redundancy. It is to be noted, however, that the drive 35 drives not a DVD but a magneto-optical disk not shown to record or reproduce data onto or from the magneto-optical disk.

The personal computer 2 is connected to the 1394 bus 11 via a 1394 interface 49. The personal computer 2 includes a CPU 41 which executes various processes in accordance with programs stored in a ROM 42, and a RAM 43 into which data, programs and so forth necessary for the CPU 41 to execute various processes are stored suitably. A keyboard 45 and a mouse 46 are connected to an input/output interface 44, and the input/output interface 44 outputs signals inputted thereto from the keyboard 45 and the mouse 46 to the CPU 41. Further, a hard disk drive (HDD) 47 is connected to the input/output interface 44 so that data, programs and so forth can be recorded onto and reproduced from a hard disk not shown by the hard disk driver 47. Further, an extended board 48 can be suitably mounted onto the input/output interface 44 so that a necessary function can be additionally provided to the personal computer 2. An EEPROM 50 is used to store information which must remain stored also after the power supply to the personal computer 2 is turned off such as information of various keys. An internal bus 51 is formed from, for example, a PCI (Peripheral Component Interconnect) bus, a local bus or the like and connects the components mentioned above to each other.

It is to be noted that the internal bus 51 is open to the user so that the user can suitably receive data transmitted by the internal bus 51 by suitably connecting a predetermined board to the extended board 48 or by producing and installing a predetermined software program.

In contrast, in any of consumer electronics (CE) apparatus such as the DVD player 1 and the magneto-optical disk apparatus 3, the internal bus 28 or the internal bus 38 is not open to a user and the user cannot acquire data transmitted in it unless special alteration is performed for it.

Figure 3:
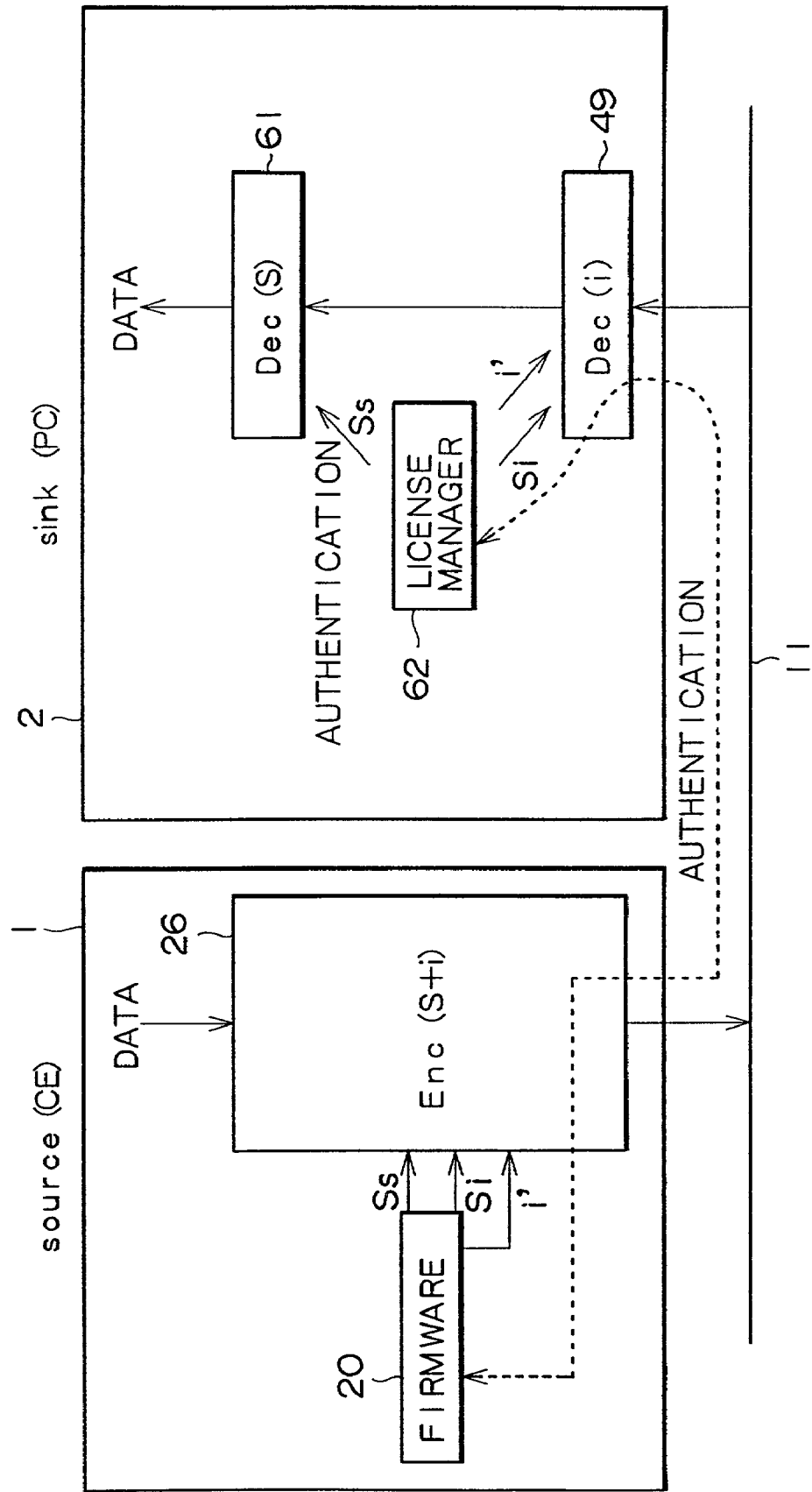
FIG. 3 is a block diagram illustrating an authentication procedure performed in the information processing system of FIG. 1.

Subsequently, a procedure of authentication performed between a source and a sink is described. Here, the authentication procedure is performed, for example, as seen in FIG. 3, between firmware 20 as one of software programs stored in advance in the ROM 22 of the DVD player 1 serving as a source and a license manager 62 as one of software programs stored in the ROM 42 of the personal computer 2 serving as a sink and processed by the CPU 41.

Figure 4:
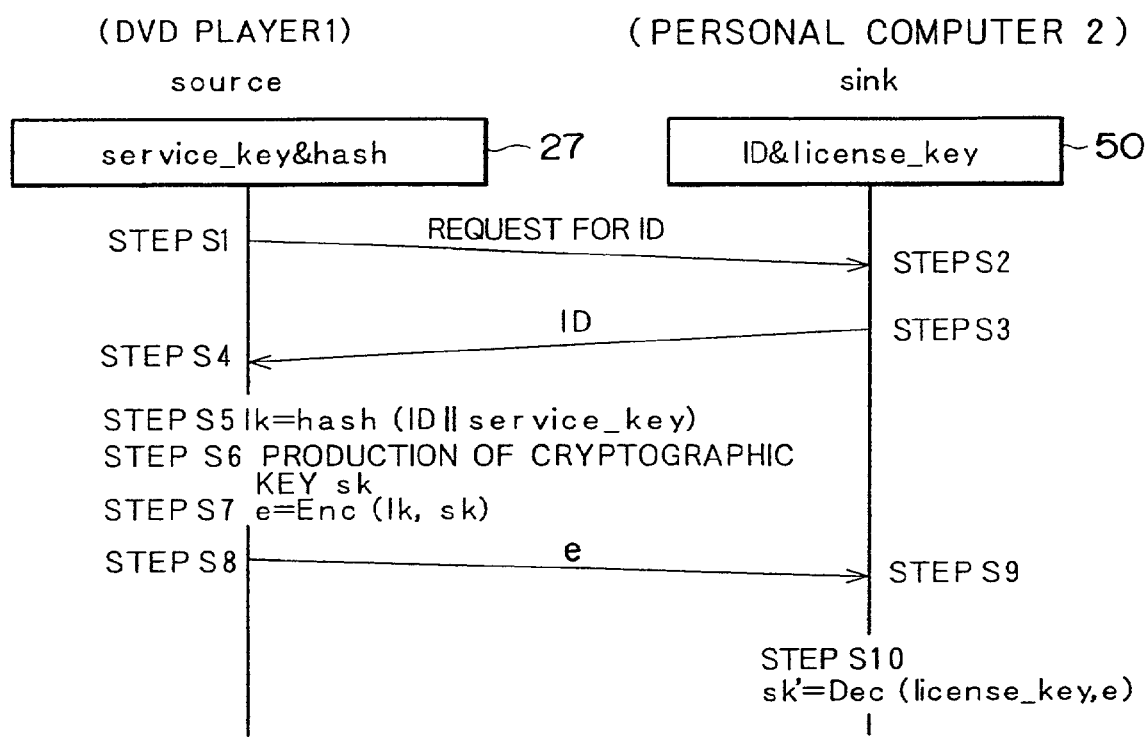
FIG. 4 is a timing chart illustrating the authentication procedure illustrated in FIG. 3.

FIG. 4 illustrates a procedure of authentication performed between the source (DVD player 1) and the sink (personal computer 2). A service key (service_key) and a function (hash) are stored in advance in the EEPROM 27 of the DVD player 1. They are both provided to the user of the DVD player 1 from the proprietor of copyright, and the user stores them in the EEPROM 27 secretly.

The service key is provided for each information provided by the proprietor of copyright and is common to systems which are constructed using the 1394 bus 11. It is to be noted that the system in the present specification signifies a general apparatus formed from a plurality of apparatus.

The hash function is a function for outputting data of a fixed length such as 64 bits or 128 bits in response to an input of an arbitrary length, and is a function with which, when y (=hash(x)) is given, it is difficult to determine x, and also it is difficult to determine a set of x1 and x2 with which hash(x1)=hash(x2) is satisfied. As representative ones of one-directional hash functions, MD5, SHA and so forth are known. The one-directional hash function is explained in detail in Bruce Schneier, "Applied Cryptography (Second Edition), Wiley".

Meanwhile, for example, the personal computer 2 as a sink stores an identification number (ID) and a license key (license_key) given from the proprietor of copyright and peculiar to the personal computer 2 itself secretly in the EEPROM 50. The license key is a value obtained by applying the hash function to data (ID || service_key) of n+m bits obtained by connecting the ID of n bits and the service key of m bits. In particular, the license key is represented by the following expression:

license_key=hash(ID || service_key)

Figure 5:
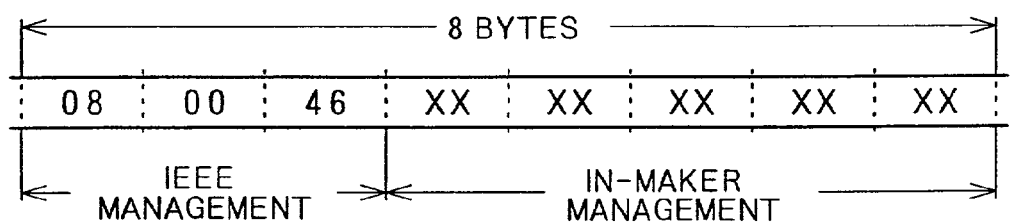
FIG. 5 is a diagrammatic view illustrating a format of a node_unique_ID.

For the ID, for example, a node_unique_ID prescribed in the standards for a 1394 bus can be used. The node_unique_ID is composed of, as seen from FIG. 5, 8 bytes (64 bits), wherein the first 3 bytes are managed by the IEEE and given from the IEEE to the individual maker of electronic apparatus. Meanwhile, the lower 5 bytes can be given by each maker to each apparatus provided to any user by the maker itself. Each maker applies, for example, numbers of the lower 5 bytes serially to individual apparatus with a single number applied to one apparatus, and if all available numbers for the 5 bytes are used up, then another node_unique_ID whose upper 3 bytes are different is given to the maker whereas a single number is applied to one apparatus with the lower 5 bytes. Accordingly, the node_unique_ID is different among different units irrespective of its maker and is unique to each unit.

In step S1, the firmware 20 of the DVD player 1 controls the 1394 interface 26 to request the personal computer 2 for an ID through the 1394 bus 11. The license manager 62 of the personal computer 2 receives the request for an ID in step S2. In particular, the 1394 interface 49 outputs, when it receives the signal of the request for an ID transmitted thereto from the DVD player 1 through the 1394 bus 11, the signal to the CPU 41. The license manager 62 of the CPU 41 reads out, when the request for an ID is received, the ID stored in the EEPROM 50 and transmits the ID from the 1394 bus 11 to the DVD player 1 through the 1394 interface 49 in step S3.

In the DVD player 1, the ID is received by the 1394 interface 26 in step S4 and supplied to the firmware 20 which is being operated by the CPU 21.

The firmware 20 couples, in step S5, the ID transmitted thereto from the personal computer 2 and the service key stored in the EEPROM 27 to produce data (ID || service_key) and applies a hash function as given by the following expression to the data to produce a key lk:

$lk = \text{hash}(ID || \text{service\_key})$

Then, in step S6, the firmware 20 produces a cryptographic key sk which is hereinafter described in detail. The cryptographic key sk is utilized as a session key in the DVD player 1 and the personal computer 2.

Then, in step S7, the firmware 20 enciphers the cryptographic key sk produced in step S6 using the key lk produced in step S5 as a key to obtain enciphered data (enciphered key) e. In other words, the firmware 20 calculates the following expression:

$e = Enc(lk, sk)$ where Enc(A, B) represents to encipher data B using a key A in a common key cryptography.

Then, in step S8, the firmware 20 transmits the enciphered data e produced in step S7 to the personal computer 2. In particular, the enciphered data e is transmitted from the 1394 interface 26 of the DVD player 1 to the personal computer 2 through the 1394 bus 11. In the personal computer 2, the enciphered data e is received by the 1394 interface 49 in step S9. The license manager 62 deciphers the enciphered data e received in this manner using the license key stored in the EEPROM 50 in accordance with the following expression to produce a deciphering key sk':

$sk' = Dec(\text{license\_key}, e)$ where Dec(A, B) represents to decipher data B using a key A in a common key cryptography.

It is to be noted that, as an algorithm for encipherment in the common key cryptography, the DES is known. Also the common key cryptography is explained in detail in "Applied Cryptography (Second Edition)" mentioned hereinabove.

The key lk produced in step S5 by the DVD player 1 has a value equal to that (license_key) stored in the EEPROM 50 of the personal computer 2. In other words, the following expression is satisfied:

lk=license_key

Accordingly, the key sk' obtained by the decipherment in step S10 by the personal computer 2 has a value equal to that of the cryptographic key sk produced in step S6 by the DVD player 1. In other words, the following expression is satisfied:

sk'=sk

In this manner, the keys sk and sk' which are equal to each other can be possessed commonly by both of the DVD player 1 (source) and the personal computer 2 (sink). Thus, either the key sk can be used as it is as a cryptographic key, or a pseudo-random number may be produced based on the key sk and used as a cryptographic key by both of the source and the sink.

Since the license key is produced based on the ID peculiar to the apparatus and the service key corresponding to information to be provided as described above, another apparatus cannot produce the key sk or sk'. Further, any apparatus which is not authorized by the proprietor of copyright cannot produce the sk or sk' since it does not have a license key. Accordingly, when the DVD player 1 thereafter enciphers reproduction data using the cryptographic key sk and transmits resulting data to the personal computer 2, where the personal computer 2 has the license key obtained legally, since it has the cryptographic key sk', it can decipher the enciphered reproduction data transmitted thereto from the DVD player 1. However, where the personal computer 2 is not legal, since it does not have the cryptographic key sk', it cannot decipher the enciphered reproduction data transmitted thereto. In other words, since only a legal apparatus can produce the common cryptographic keys sk and sk', authentication is performed as a result.

Even if the license key of the single personal computer 2 is stolen, since the ID is different among different units, it is impossible for another apparatus to decipher enciphered data transmitted thereto from the DVD player 1 using the license key. Accordingly, the security is augmented.

Figure 6:
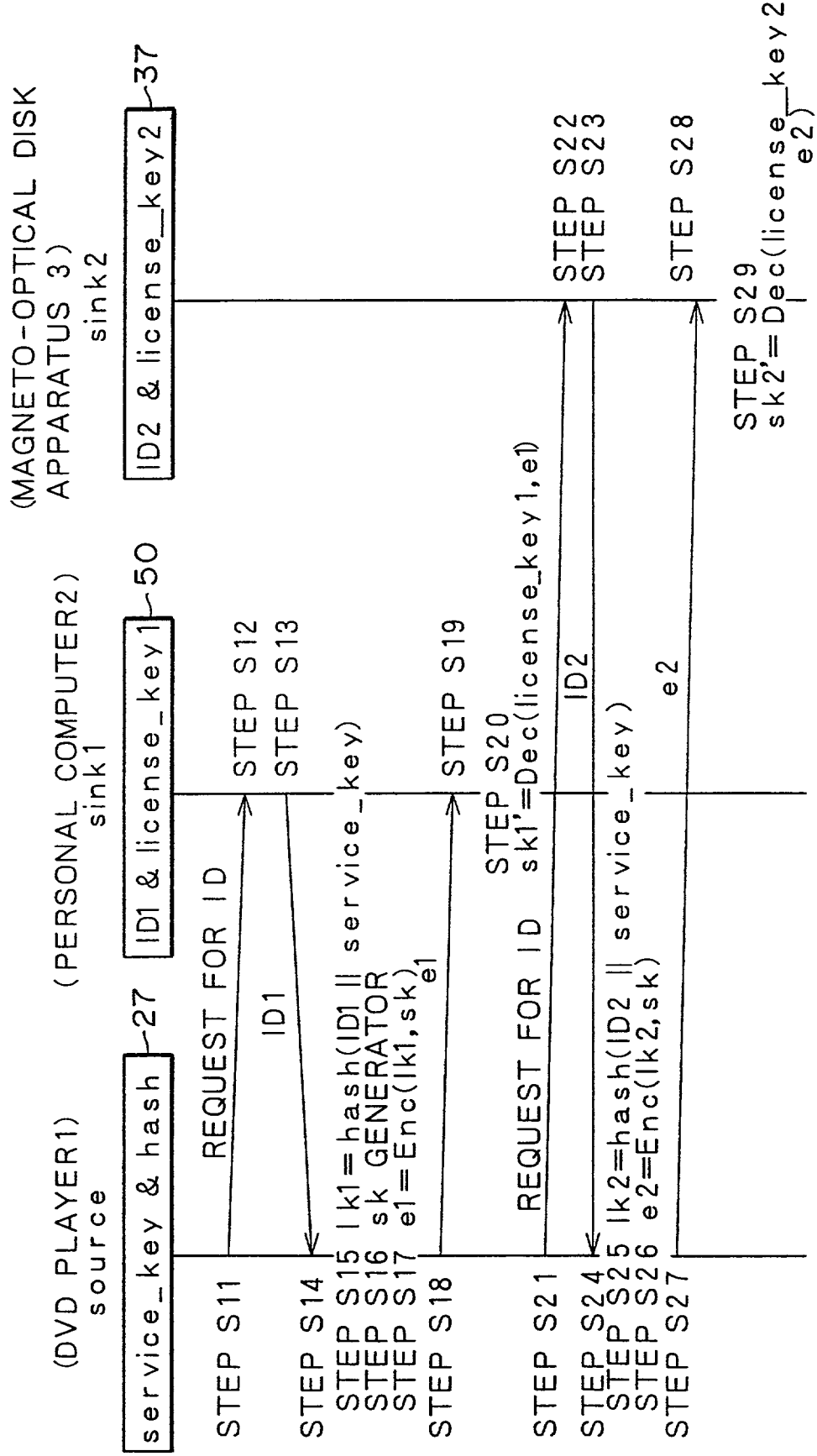
FIG. 6 is a timing chart illustrating another authentication procedure.

FIG. 6 illustrates an exemplary procedure when not only the personal computer 2 but also the magneto-optical disk apparatus 3 function as a sink with respect to a source (DVD player 1).

In this instance, an ID1 is stored as an ID and a license_key1 is stored as a license key in the EEPROM 50 of the personal computer 2 which serves as a sink1, but in the magneto-optical disk apparatus 3 which serves as a sink2, an ID2 is stored as an ID and a license_key2 is stored as a license key in the EEPROM 37.

Processes in steps S11 to S20 performed between the DVD player 1 (source) and the personal computer 2 (sink1) are substantially similar to the processes in steps S1 to S10 illustrated in FIG. 4. Therefore, description of the processes in steps S11 to S20 is omitted to avoid redundancy.

Figure 10:
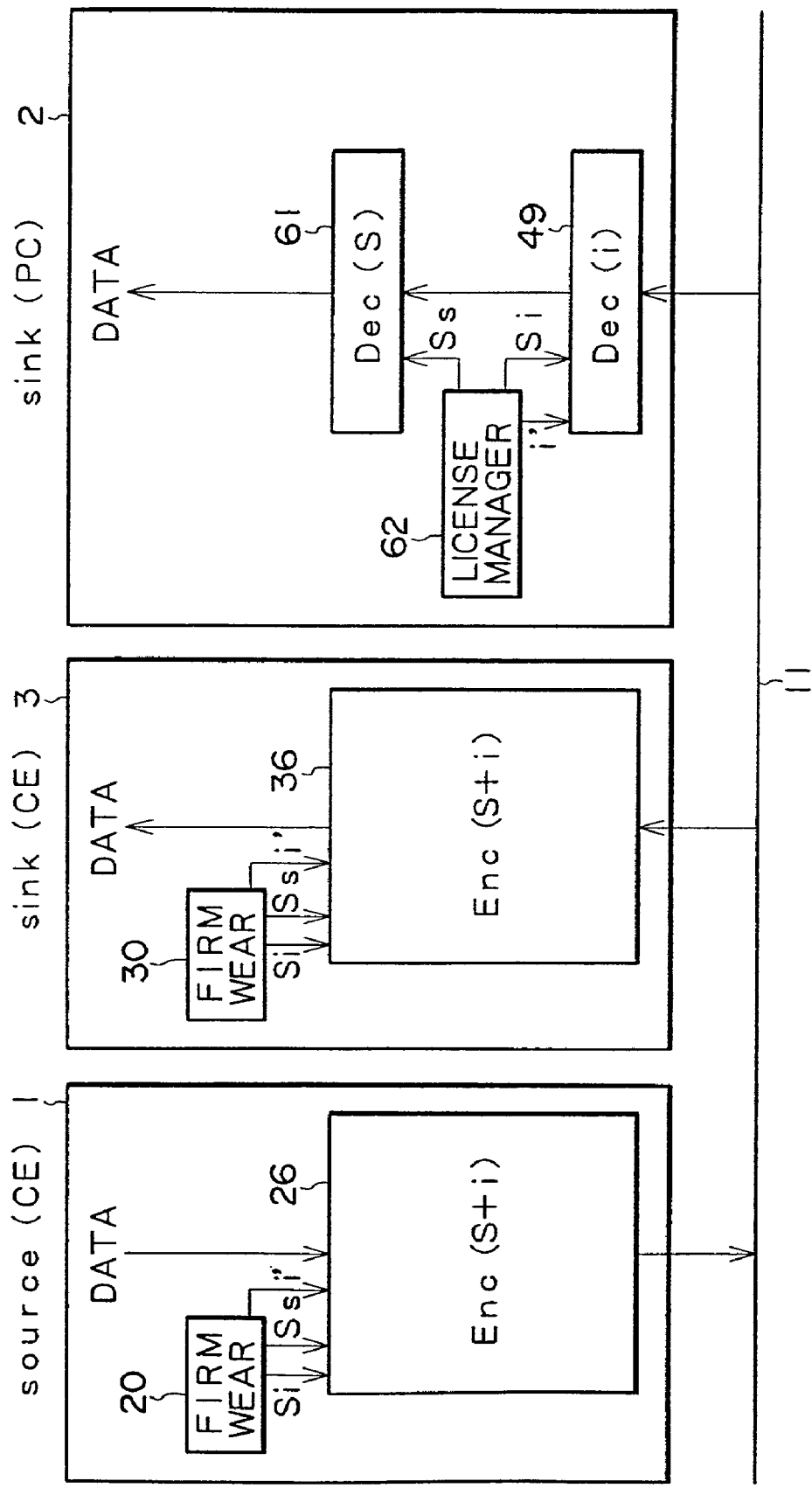
FIG. 10 is a block diagram illustrating an enciphering procedure.

After the DVD player 1 cooperates with the personal computer 2 to perform an authentication procedure in such a manner as described above, it requests, in step S21, the magneto-optical disk apparatus 3 for an ID. When the ID requesting signal is received via the 1394 interface 36 in step S22 by the magneto-optical disk apparatus 3, firmware 30 (FIG. 10) in the magneto-optical disk apparatus 3 reads out the ID (ID2) stored in the EEPROM 37 in step S23 and transmits the ID from the 1394 interface 36 to the DVD player 1 through the 1394 bus 11. The firmware 20 of the DVD player 1 receives the ID2 via the 1394 interface 26 in step S24 and produces a key lk2 based on the following expression in step S25:

$lk2 = hash(ID2 \mid\mid service\_key)$

Further, the firmware 20 calculates the following expression in step S26 to encipher the key sk produced in step S16 using the key lk2 produced in step S25 to produce enciphered data e2:

$e2 = Enc(lk2, sk)$

Then, in step S27, the firmware 20 transmits the enciphered data e2 from the 1394 interface 26 to the magneto-optical disk apparatus 3 through the 1394 bus 11.

The magneto-optical disk apparatus 3 receives the enciphered data e2 via the 1394 interface 36 in step S28, and calculates the following expression in step S29 to produce a cryptographic key sk2':

$sk2' = Dec(license\_key2, e2)$

The cryptographic keys sk1' and sk2' are obtained by the personal computer 2 and the magneto-optical disk apparatus 3, respectively, in such a manner as described above. The values of them are an equal value to the cryptographic key sk of the DVD player 1.

Figure 7:
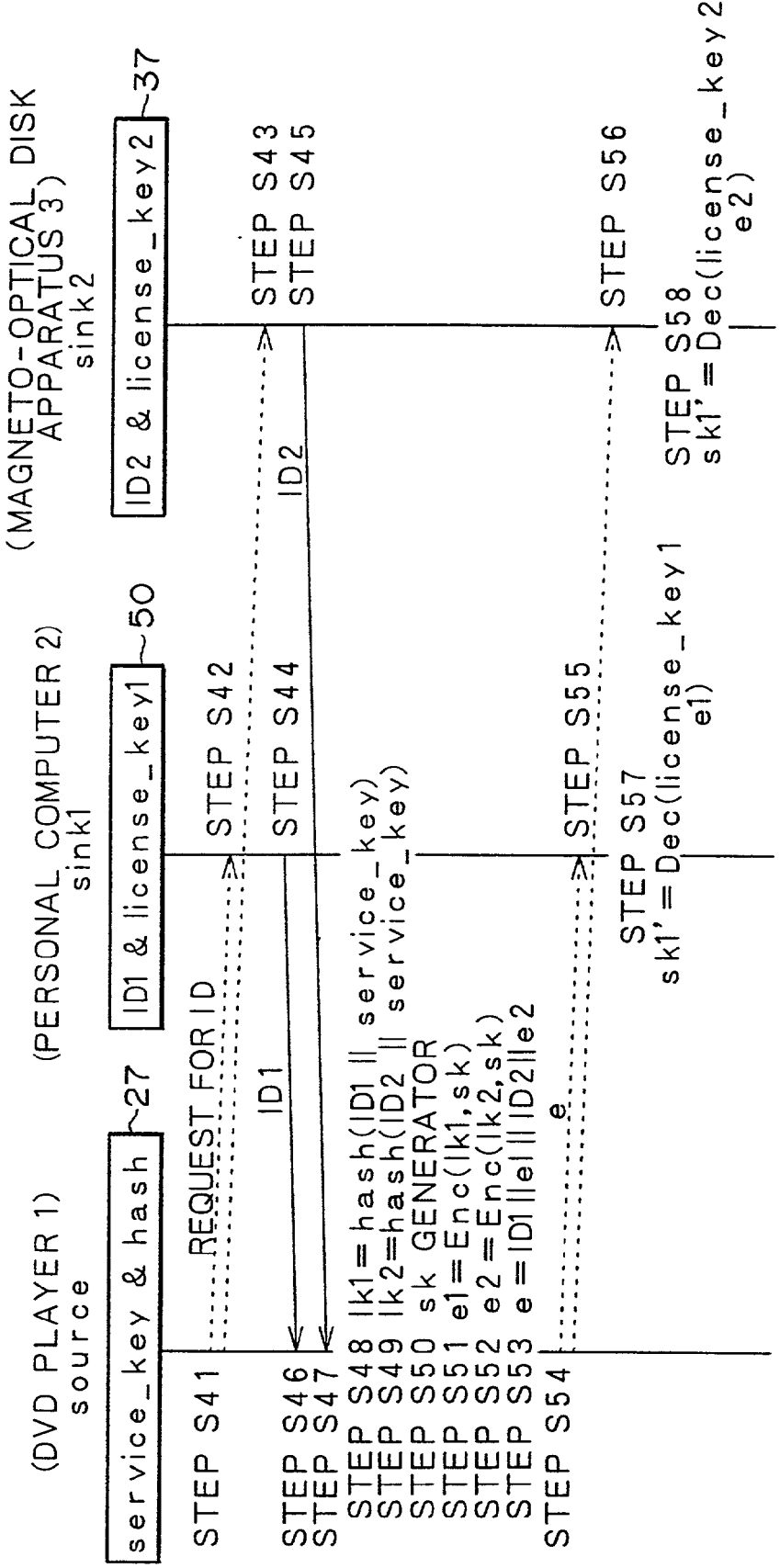
FIG. 7 is a similar view but illustrating a further authentication procedure.

While, in the procedure of FIG. 6, the DVD player 1 requests the personal computer 2 and the magneto-optical disk apparatus 3 individually for an ID and processes the received IDs, where a request for an ID can be delivered by broadcast communication, such a procedure as illustrated in FIG. 7 can be performed.

In particular, in the procedure of FIG. 7, the DVD player 1 as a source requests all sinks, which are, in the present procedure, the personal computer 2 and the magneto-optical disk apparatus 3, for an ID by broadcast communication. After the personal computer 2 and the magneto-optical disk apparatus 3 receive the signal of the request for transfer of an ID in steps S42 and S43, respectively, each of them reads out the ID1 or the ID2 stored in the EEPROM 50 or the EEPROM 37 and transfers it to the DVD player 1 in step S44 or step S45. The DVD player 1 receives the IDs in steps S46 and S47.

The DVD player 1 produces a cryptographic key lk1 based on the following expression in step S48:

$lk1 = hash(ID1 \mid\mid service\_key)$

Further, in step S49, a cryptographic key lk2 is produced based on the following expression:

$lk2 = has(ID2 \mid\mid service\_key)$

In the DVD player 1, a cryptographic key sk is produced further in step S50, and in step S51, the cryptographic key sk is enciphered as given by the following expression using the key lk1 as a key:

$e1 = Enc(lk1, sk)$

Further, in step S52, the cryptographic key sk is enciphered in accordance with the following expression using the key lk2 as a key:

$e2 = Enc(lk2, sk)$

Furthermore, in step S53, the values ID1, e1, ID2 and e2 thus obtained are coupled as given by the following expression to produce enciphered data e:

$e = ID1 \mid\mid e1 \mid\mid ID2 \mid\mid e2$

The enciphered data e produced in the DVD player 1 in such a manner as described above is transmitted to the personal computer 2 and the magneto-optical disk apparatus 3 by broadcast communication further in step S54.

The personal computer 2 and the magneto-optical disk apparatus 3 receive the enciphered data e in steps S55 and S56, respectively. Then, in the personal computer 2 and the magneto-optical disk apparatus 3, calculation indicated by the following expressions is performed in steps S57 and S58 so that cryptographic keys sk1' and sk2' are produced, respectively:

$sk1' = Dec(license\_key1, e1)$ $sk2' = Dec(license\_key2, e2)$

Figure 8:
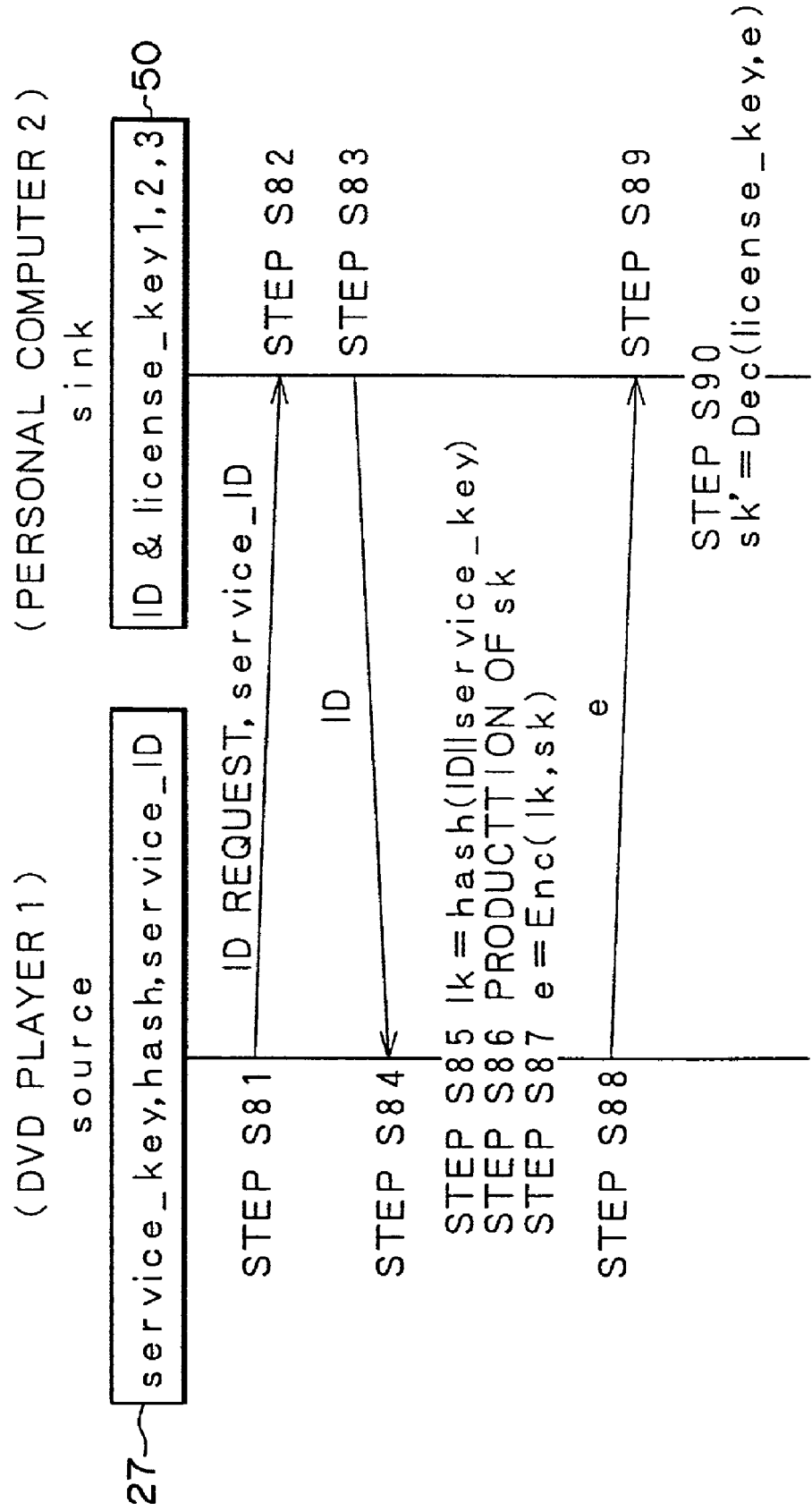
FIG. 8 is a similar view but illustrating a still further authentication procedure.

FIG. 8 illustrates an example of a procedure where one sink can enjoy a plurality of services (decipherment of a plurality of kinds of information). Referring to FIG. 8, in the present procedure, for example, the personal computer 2 serving as a sink has a plurality of license keys (license$_{13}$ key1, license_key2, license_key3 and so forth) stored in the EEPROM 50 thereof. The DVD player 1 serving as a source has a plurality of service keys (service_key1, service_key2, service_key3 and so forth) stored in the EEPROM 27 thereof. In this instance, when the DVD player 1 requests the personal computer 2 as a sink for an ID in step S81, it transfers a service ID for identification of information (a service) to be transferred subsequently from the DVD player 1. When the personal computer 2 receives the service_ID in step S82, it selects one of the plurality of license keys stored in the EEPROM 50 which corresponds to the service_ID and performs deciphering processing in step S90 using the selected license key. The other operations are similar to those illustrated in FIG. 4.

Figure 9:
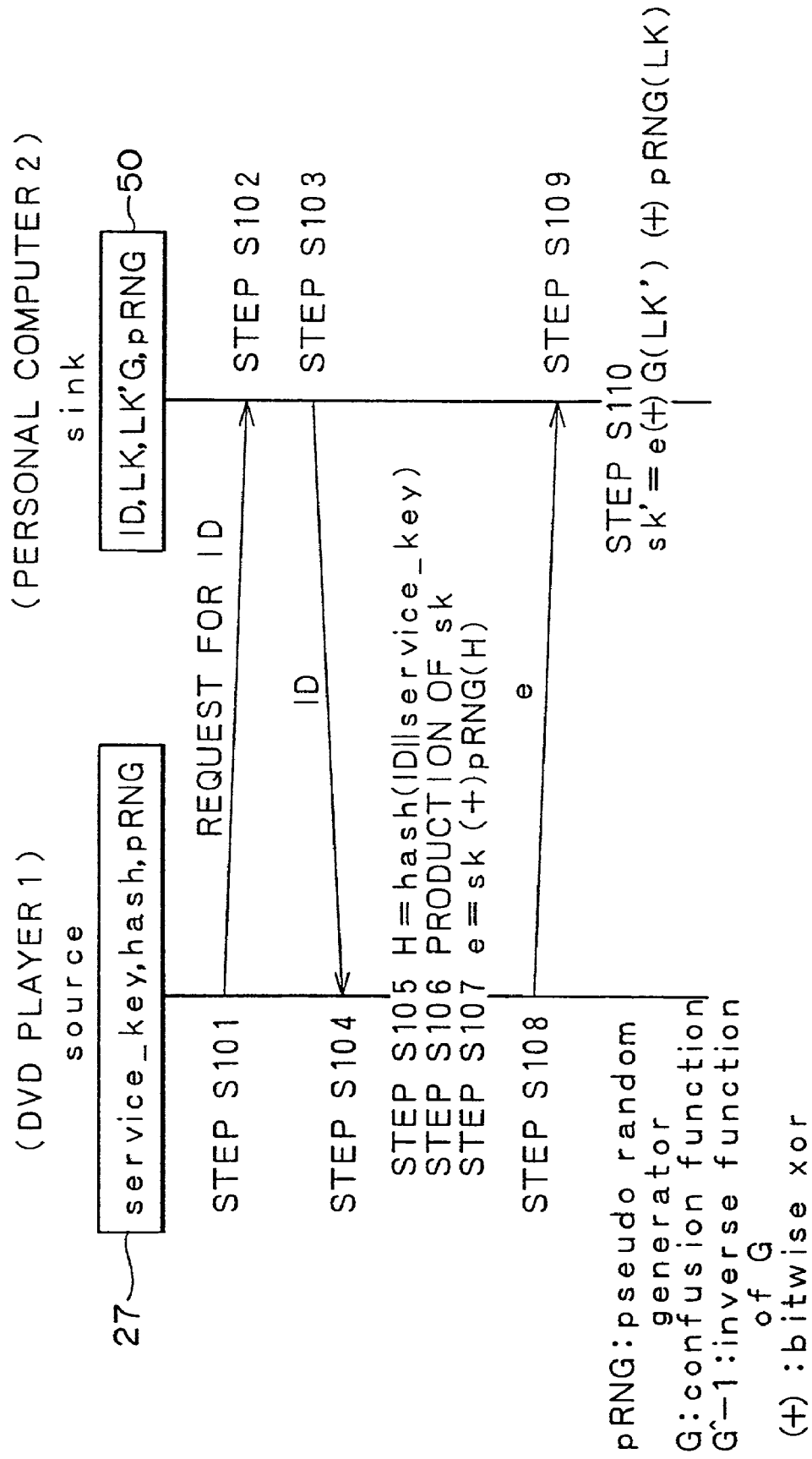
FIG. 9 is a similar view but illustrating a yet further authentication procedure.

FIG. 9 illustrates a further example of a procedure. In the present procedure, the DVD player 1 serving as a source has a service_key, a hash function and a pseudo-random number generation function pRNG stored in the EEPROM 27 thereof. They have been given from the proprietor of copyright and are stored secretly. Meanwhile, in the EEPROM 50 of the personal computer 2 serving as a sink, an ID, LK, LK', function G and pseudo-random number generation function pRNG given thereto from the proprietor of copyright are stored.

LK is a unique random number produced by the proprietor of copyright, and LK' is produced so that it may satisfy the following expressions:

$LK' = G^{-1}(R)$ $R = pRNG(H)(+)pRNG(LK)$ $H = hash(ID \mid\mid service\_key)$

It is to be noted that $G^{-1}$ signifies an inverse function of G. $G^{-1}$ has such a characteristic that it can be calculated simply if a predetermined rule is known, but if the rule is not known, it is difficult to calculate. For such a function, a function which is used for a public key cryptography can be used.

Further, the pseudo-random function generation function may be provided as hardware.

The firmware 20 of the DVD player 1 first requests the license manager 62 of the personal computer 2 for an ID in step S101. The license manager 62 of the personal computer 2 reads out, when it receives the ID requesting signal in step S102, the ID stored in the EEPROM 50 and transfers it to the DVD player 1 in step S103. The firmware 20 of the DVD player 1 receives this ID in step S104 and calculates the following expression in step S105:

$$H = \text{hash}(ID \,||\, \text{service\_key})$$

Further, the firmware 20 produces a key sk in step S106 and calculates the following expression in step S107:

$$e = sk(+)pRNG(H)$$

It is to be noted that A(+)B represents operation of exclusive ORing of A and B.

In other words, the key sk is enciphered by operating exclusive ORing, for each bit, of a result pRNG (H) obtained by inputting H calculated in step S105 to the pseudo-random generation key pRNG and the key sk produced in step S106.

Then, in step S108, the firmware 20 transmits e to the personal computer 2.

In the personal computer 2, this e is received in step S109, and the following expression is calculated in step S110:

$$sk' = e(+)G(LK')(+)pRNG(LK)$$

In particular, exclusive ORing of e transmitted from the DVD player 1, the value G(LK') obtained by applying LK' stored in the EEPROM 50 to the function G also stored in the EEPROM 50 and the result PRNG(LK) obtained by applying LK stored stored in the EEPROM 50 to the pseudo-random number generation function pRNG also stored in the EEPROM 50 is calculated to obtain a key sk'.

Here, as seen from the following expression, sk=sk':

$$\begin{aligned} sk' &= e(+)G(LK')(+)pRNG(LK) \\ &= sk(+)pRNG(H)(+)R(+)pRNG(LK) \\ &= sk(+)pRNG(H)(+)pRNG(H)(+)pRNG(LK)(+)pRNG(LK) \\ &= sk \end{aligned}$$

In this manner, the DVD player 1 as a source and the personal computer 2 as a sink can possess the cryptographic keys sk and sk', which are equal to each other, commonly. Since only the proprietor of copyright can produce LK and LK', even if the source tries to produce LK or LK' illegally, it cannot produce the same, and consequently, the security can be further promoted.

While, in the description above, authentication is performed between a source and a sink, for example, the personal computer 2 can normally use an arbitrary application program as a load. Further, as such application program, an application program produced illegally may be used. Accordingly, for each application program, it must be discriminated whether or not it is licensed from the proprietor of copyright. Therefore, as shown in FIG. 3, also between each application section 61 and the license manager 62, authentication processing may be performed in such a manner as described above. In this instance, the license manager 62 serves as a source, and the application section 61 serves as a sink.

Subsequently, operation when, after authentication is performed (after common possession of a cryptographic key is performed), enciphered data is transferred from a source using a cryptographic key to a sink and the enciphered data is deciphered by the sink is described.

In an apparatus whose internal functions are not open to an ordinary user such as the DVD player 1 or the magneto-optical disk apparatus 3, processing of encipherment and decipherment of data communicated through the 1394 bus 11 is performed by the 1394 interface 26 or the 1394 interface 36. While, for the encipherment and the decipherment, a session key S and a time variable key i are used, the session key S and the time variable key i (more accurately, a key i' to be used for production of the time variable key i) are supplied from the firmware 20 or the firmware 30 to the 1394 interface 26 or the 1394 interface 36, respectively. The session key S is composed of an initial value key Ss to be used as an initial value and a disturbance key Si to be used for disturbing the time variable key i. The initial value key Ss and the disturbance key Si can be composed of upper bits and lower bits of predetermined bit numbers of a cryptographic key sk (=sk') produced in the authentication described above, respectively. The session key S is suitably updated for each session, for example, for information of each one movie or for each reproduction. In contrast, the time variable key i produced from the disturbance key Si and the key i' is updated frequently in one session, and for example, time information at a predetermined timing or the like can be used.

Now, it is assumed that video data reproduced by and outputted from the DVD player 1 service as a source is transmitted to the magneto-optical disk apparatus 3 and the personal computer 2 through the 1394 bus 11 so that it is deciphered by the magneto-optical disk apparatus 3 and the personal computer 2. In this instance, in the DVD player 1, enciphering processing is performed using the session key S and the time variable key i by the 1394 interface 26. In the magneto-optical disk apparatus 3, deciphering processing is performed using the session key S and the time variable key i by the 1394 interface 36.

In contrast, in the personal computer 2, the license manager 62 supplies the initial value key Ss of the session key S to the application section 61 and supplies the disturbance key Si and the time variable key i (more accurately, the key i' for production of the time variable key i) to the 1394 interface 49 (link portion). Then, by the 1394 interface 49, a time variable key i is produced from the disturbance key Si and the key i' and decipherment is performed using the time variable key i, and the deciphered data is further deciphered using the session key S (more accurately, the initial value key Ss) by the application section 61.

In this manner, in the personal computer 2, since the internal bus 51 is open to a user, only decipherment in the first stage is performed by the 1394 interface 49 so that resulting data still remains in a condition of a cryptograph. Then, further decipherment in the second stage is performed by the application section 61 to produce a non-cryptograph. By this, the personal computer 2 is inhibited from adding a function suitably to the same to copy data (a non-cryptograph) communicated by the internal bus 51 onto the hard disk 47 or any other apparatus.

In this manner, in the present system, while, in a CE apparatus whose internal bus is not open, an enciphering or deciphering procedure is performed once using a session key S and a time variable key i, in another apparatus (the personal computer 2 or the like) whose internal bus is open, a deciphering procedure is performed separately as a deciphering procedure in which the time variable key i is used and another deciphering procedure in which the session key S is used. In order to allow both of the deciphering procedure by one stage and the deciphering procedure by two separate stages to be performed in this manner, the following expression must be satisfied:

$$Dec(S,Dec(i,Enc(algo(S+i),Data)))=Data$$

where algo(S+i) represents a result obtained by inputting the session key S and the time variable key i to a predetermined algorithm.

Figure 11:
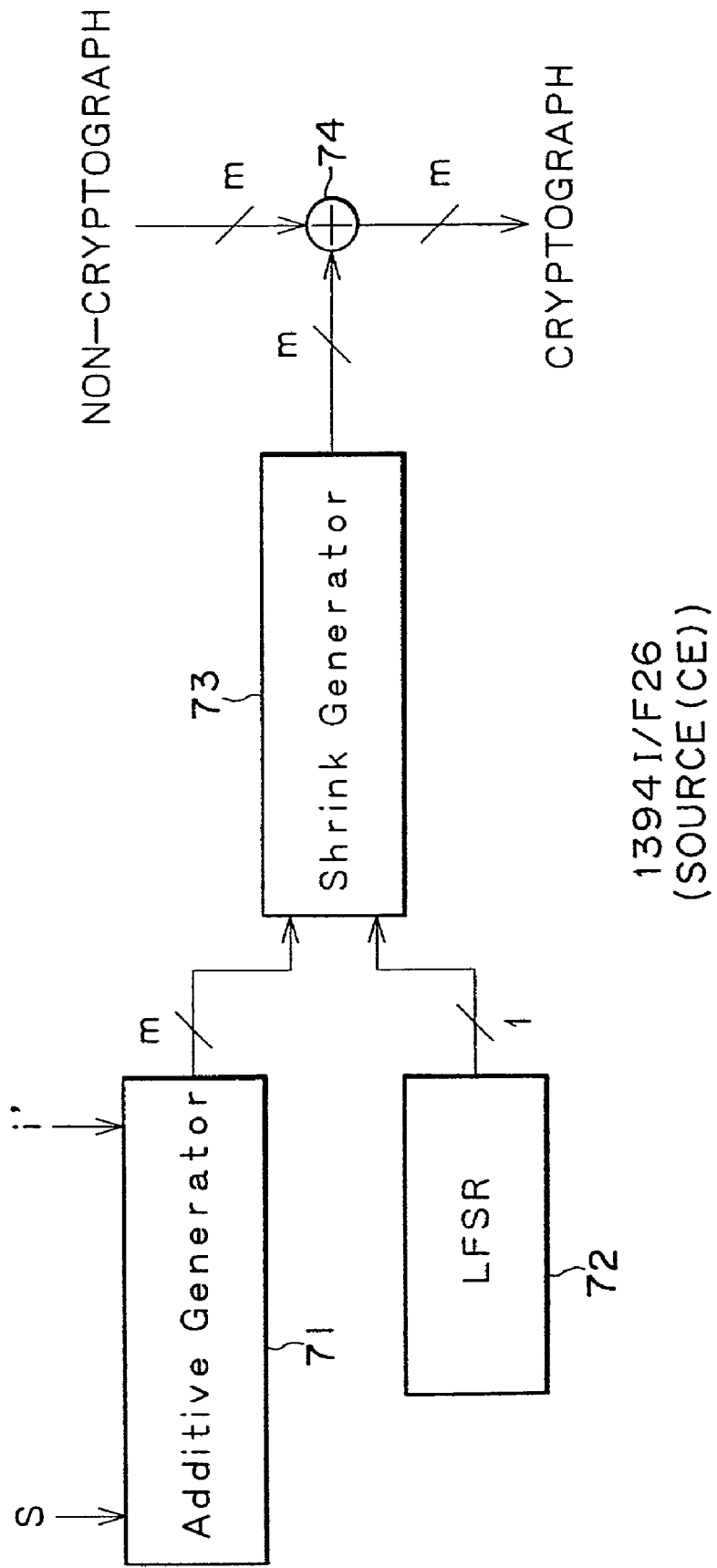
FIG. 11 is a block diagram showing an example of a construction of a 1394 interface used in the enciphering procedure of FIG. 10.

FIG. 11 shows an example of a construction of the 1394 interface 26 which satisfies the expression above. Referring to FIG. 11, in the 1394 interface 26 shown, data of m bits produced by an additive generator 71 is supplied to a shrink generator 73. Meanwhile, a linear feedback shift register (LFSR) 72 outputs data of 1 bit and supplies it to the shrink generator 73. The shrink generator 73 selects the output of the additive generator 71 in response to the output of the linear feedback shift register 72 and outputs the selected data as a cryptographic key to an adder 74. The adder 74 adds an inputted non-cryptograph (data of m bits to be transmitted to the 1394 bus 11) and the data of m bits (cryptographic key) supplied from the shrink generator 73 and outputs a result of the addition as a cryptograph (enciphered data) to the 1394 bus 11.

The addition processing of the adder 74 is addition of the output of the shrink generator 73 and a non-cryptograph by mod 2^m (^ signifies a power exponent). In other words, data of m bits are added to each other, and a sum with a carry-over ignored is outputted.

Figure 12:
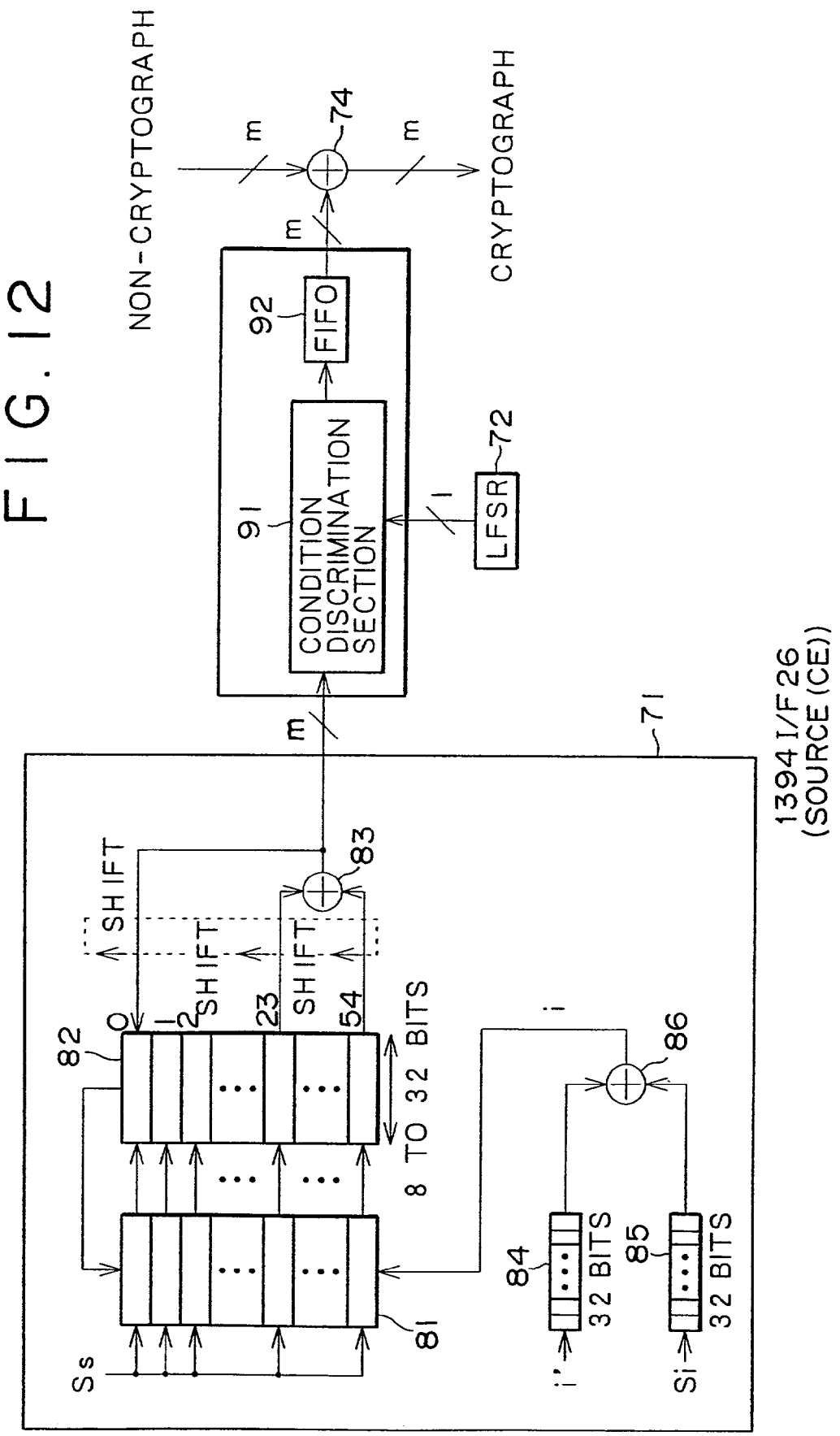
FIG. 12 is a block diagram showing an example of a more detailed construction of the 1394 interface of FIG. 11.

FIG. 12 shows an example of a more detailed construction of the 1394 interface 26 shown in FIG. 11. Of the session key S outputted from the firmware 20, the initial value key Ss is transferred via an adder 81 to and stored into a register 82. The initial value key Ss is composed of, for example, 55 words (one word has a width from 8 bits to 32 bits). Further, of the session key S supplied from the firmware 20, the disturbance key Si composed of, for example, 32 bits of the LSB (Least Significant Bit) side is stored into another register 85.

A key i' is stored into a further register 84. Here, for example, each time one packet is transmitted through the 1394 bus 11, a key 1' of 2 bits is supplied to the register 84, and when a key 1' for 16 packets (32 bits) is stored into the register 84, it is added to the disturbance key Si of 32 bits stored in the register 85 by an adder 86 and is supplied as a final time variable key i to the adder 81. The adder 81 adds the value currently stored in the register 82 and the time variable key i supplied from the adder 86 and supplies a result of the addition to the register 82 so that it is stored into the register 82.

Where the number of bits of a word of the register 82 is, for example, 8, since the time variable key i outputted from the adder 86 is 32 bits, the time variable key i is divided into four parts of 8 bits, and each 8 bits are added to the word of a predetermined address (0 to 54) of the register 82.

After the initial value key Ss is first stored into the register 82 in this manner, it is updated with the time variable key i each time a non-cryptograph for 16 packets is transmitted.

An adder 83 selects predetermined 2 words (in the case of a timing illustrated in FIG. 12, the words at the address 23 and the address 54) of the 55 words stored in the register 82, and adds the two selected words and outputs a resulting word to the shrink generator 73. Further, the output of the adder 83 is transferred, at the timing illustrated in FIG. 12, to the address 0 of the register 82 so that it is stored in place of the preceding stored value at the address 0.

Then, at the next timing, the addresses of the two words to be supplied to the adder 83 are shifted upwardly by one word in FIG. 12 from the address 54 and the address 23 to the address 53 and the address 22, respectively, and also the address to be updated with the output of the adder 83 is shifted to a higher address in the figure. However, since an address higher than the address 0 is not present, in this instance, the address is shifted to the address 54.

It is to be noted that the adders 81, 83 and 86 may otherwise operate exclusive ORing.

Figure 13:
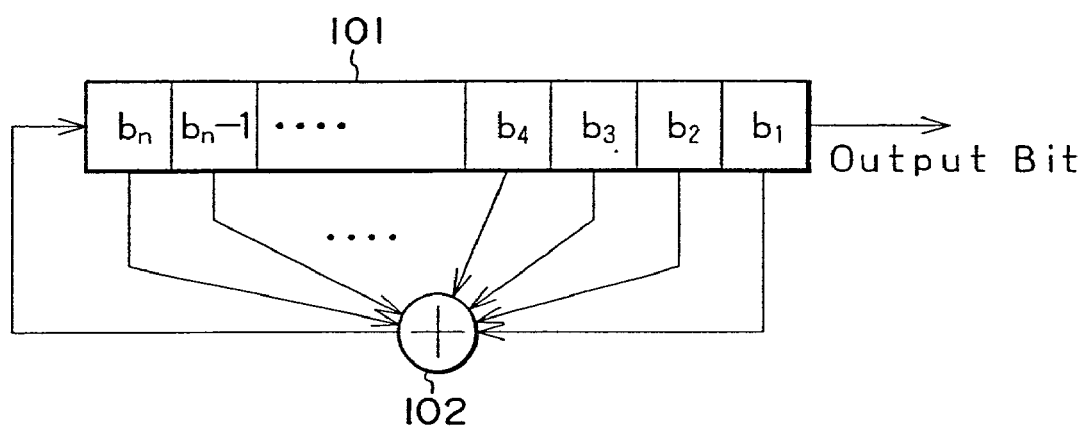
FIG. 13 is a block diagram showing an example of a more detailed construction of a linear feedback shift register shown in FIG. 12.

The linear feedback shift register 72 is composed of, for example, as shown in FIG. 13, a shift register 101 of n bits, and an adder 102 for adding values of predetermined bits (registers) of the n bits of the shift register 101. The shift register 101 stores a bit supplied from the adder 102 into the register $b_n$ leftmost in FIG. 13 and shifts data which has been stored there till then to the next register $b_{n-1}$ on the right side. Also the registers $b_{n-1}$, $b_{n-2}$, ... perform similar processing. Then, at a further next timing, a value obtained by addition of the values of the bits by the adder 102 is stored into the leftmost bit $b_n$ in FIG. 13. The operations described above are successively repeated while an output is successively outputted one by one bit from the rightmost register $b_1$ in FIG. 13.

Figure 14:
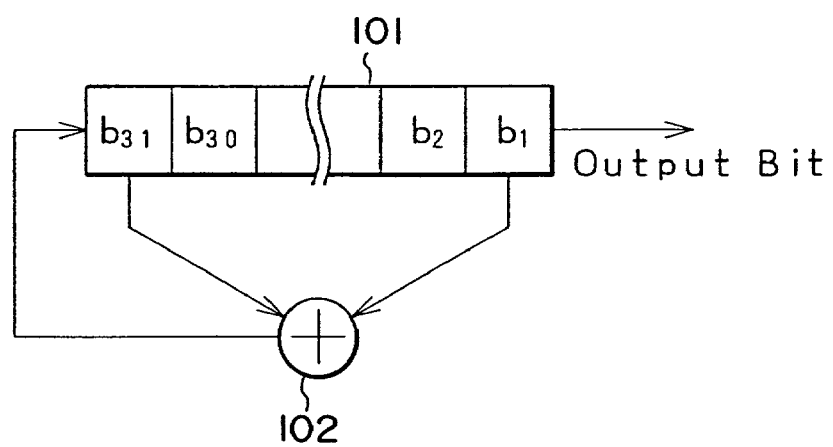
FIG. 14 is a block diagram showing an example of a more detailed construction of the linear feedback shift register of FIG. 13.

While FIG. 13 shows an example of an ordinary construction, more particularly the linear feedback shift register 72 may be constructed in such a manner as shown, for example, in FIG. 14. In the linear feedback shift register 72 shown in FIG. 14, the shift register 101 is composed of 31 bit, and the value of the register $b_1$ at the right end in FIG. 14 and the register $b_{31}$ at the left end in FIG. 14 are added by the adder 102, and a result of the addition is fed back to the register $b_{31}$.

When the data of 1 bit outputted from the linear feedback shift register 72 has the logical value 1, a condition discrimination section 91 transfers data of m bits supplied from the adder 83 of the additive generator 71 as it is to a FIFO (first-in first-out) memory 92 so as to be stored into the FIFO 92. On the other hand, when the data of 1 bit supplied from the linear feedback shift register 72 has the logic value 0, the condition discrimination section 91 does not accept the data of m bits supplied from the CPU 31 but interrupts the enciphering processing. In this manner, only those of data of m bits produced by the additive generator 71 which are outputted at timings at which the linear feedback shift register 72 outputs the logical value 1 are selected and stored into the FIFO 92 of the shrink generator 73.

The data of m bits stored in the FIFO 92 is supplied as a cryptographic key to the adder 74, by which it is added to data of a non-cryptograph to be transmitted (reproduction data from a DVD) to produce a cryptograph.

The enciphered data is supplied from the DVD player 1 to the magneto-optical disk apparatus 3 and the personal computer 2 through the 1394 bus 11.

Figure 15:
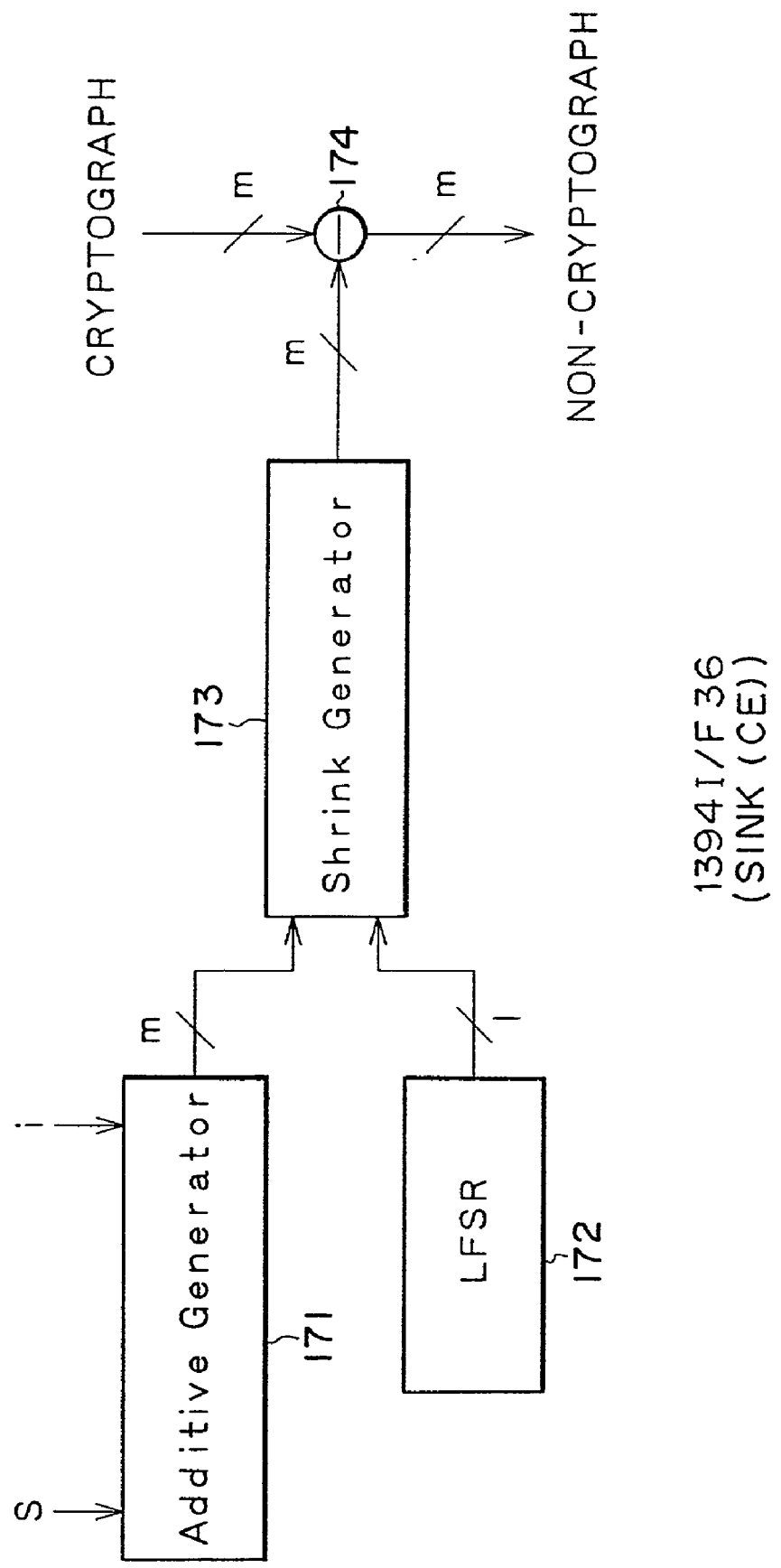
FIG. 15 is a block diagram showing an example of a construction of a 1394 interface used in the enciphering procedure of FIG. 10.

The 1394 interface 36 of the magneto-optical disk apparatus 3 has such a construction as shown in FIG. 15 in order to decipher data received from the 1394 bus 11. Referring to FIG. 15, in the 1394 interface 36 shown, data of m bits outputted from an additive generator 171 and data of 1 bit outputted from a linear feedback shift register 172 are supplied to a shrink generator 173. Then, a key of m bits outputted from the shrink generator 173 is supplied to a subtractor 174. The subtractor 174 subtracts the key supplied from the shrink generator 173 from a cryptograph to decipher the cryptograph into a non-cryptograph.

In particular, the 1394 interface 36 shown in FIG. 15 has a basically similar construction to the 1394 interface 26 shown in FIG. 11, but is different only in that the adder 74 shown in FIG. 11 is replaced by the subtractor 174.

Figure 16:
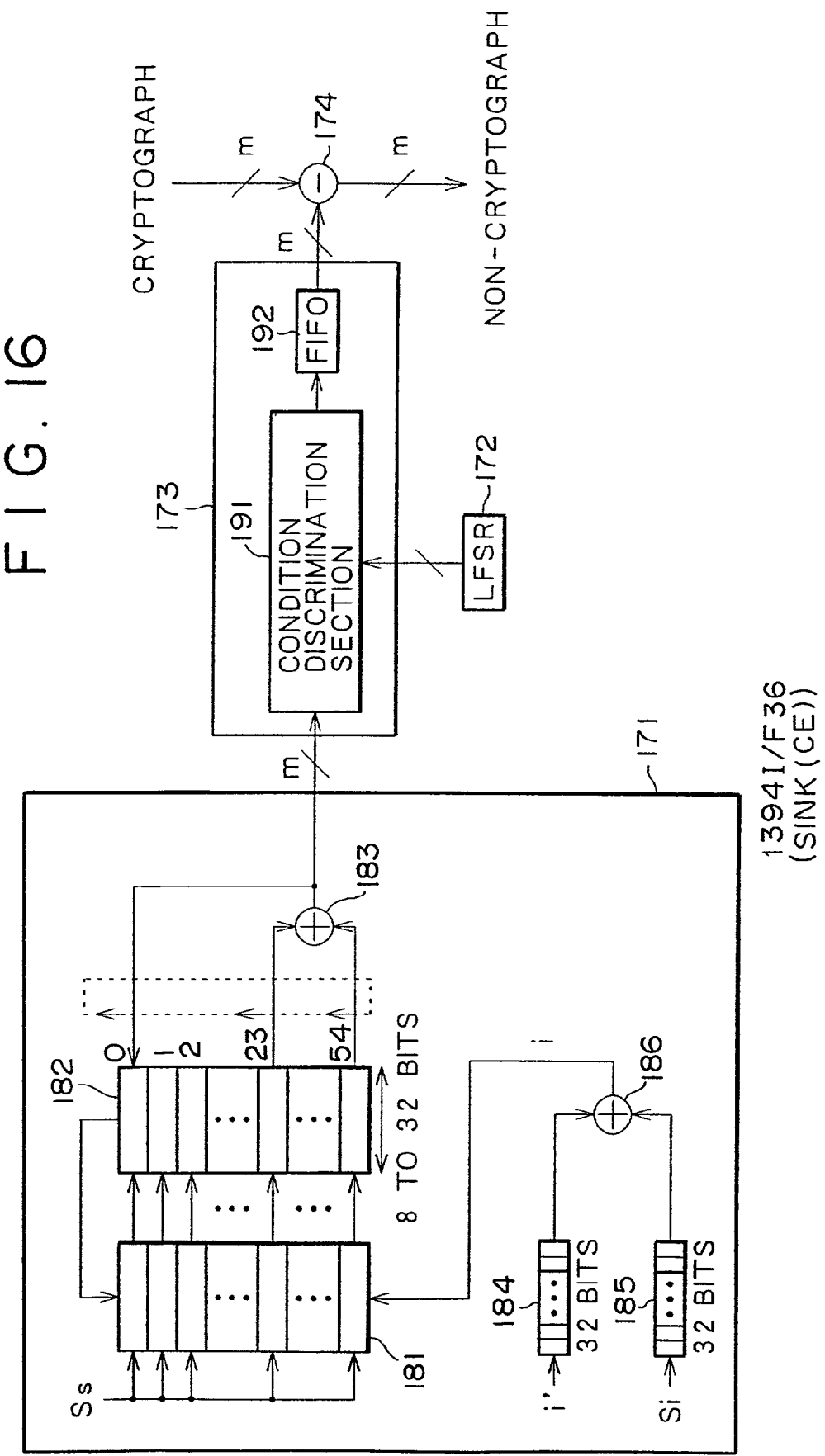
FIG. 16 is a block diagram showing an example of a more detailed construction of the 1394 interface of FIG. 15.

FIG. 16 shows an example of a more detailed construction of the 1394 interface 36 shown in FIG. 15. Referring to FIG. 16, while also the 1394 interface 36 has a basically similar construction to the 1394 interface 26 shown in FIG. 12, the adder 74 shown in FIG. 12 is replaced by the subtractor 174. The other components of the additive generator 171, the linear feedback shift register 172, the shrink generator 173, an adder 181, a register 182, another adder 183, registers 184 and 185, a further adder 186, a condition discrimination section 191 and a FIFO 192 correspond to the additive generator 71, linear feedback shift register 72, shrink generator 73, adder 81, register 82, adder 83, registers 84 and 85, adder 86, condition discrimination section 91 and FIFO 92 shown in FIG. 12, respectively.

Accordingly, since operation of the 1394 interface 36 is basically same as that of the 1394 interface 26 shown in FIG. 12, overlapping description of it is omitted here to avoid redundancy. However, in the 1394 interface 36 of FIG. 16, a key of m bits outputted from the FIFO 192 of the shrink generator 173 is subtracted from a cryptograph by the subtractor 174 to decipher the cryptograph into a non-cryptograph.

As described above, in the 1394 interface 36, enciphered data are deciphered at a time using the session key S (initial value key Ss and disturbance key Si) and the time variable key i.

In contrast, as described above, in the personal computer 2, decipherment is performed in two stages individually by the 1394 interface 49 and the application section 61.

Figure 17:
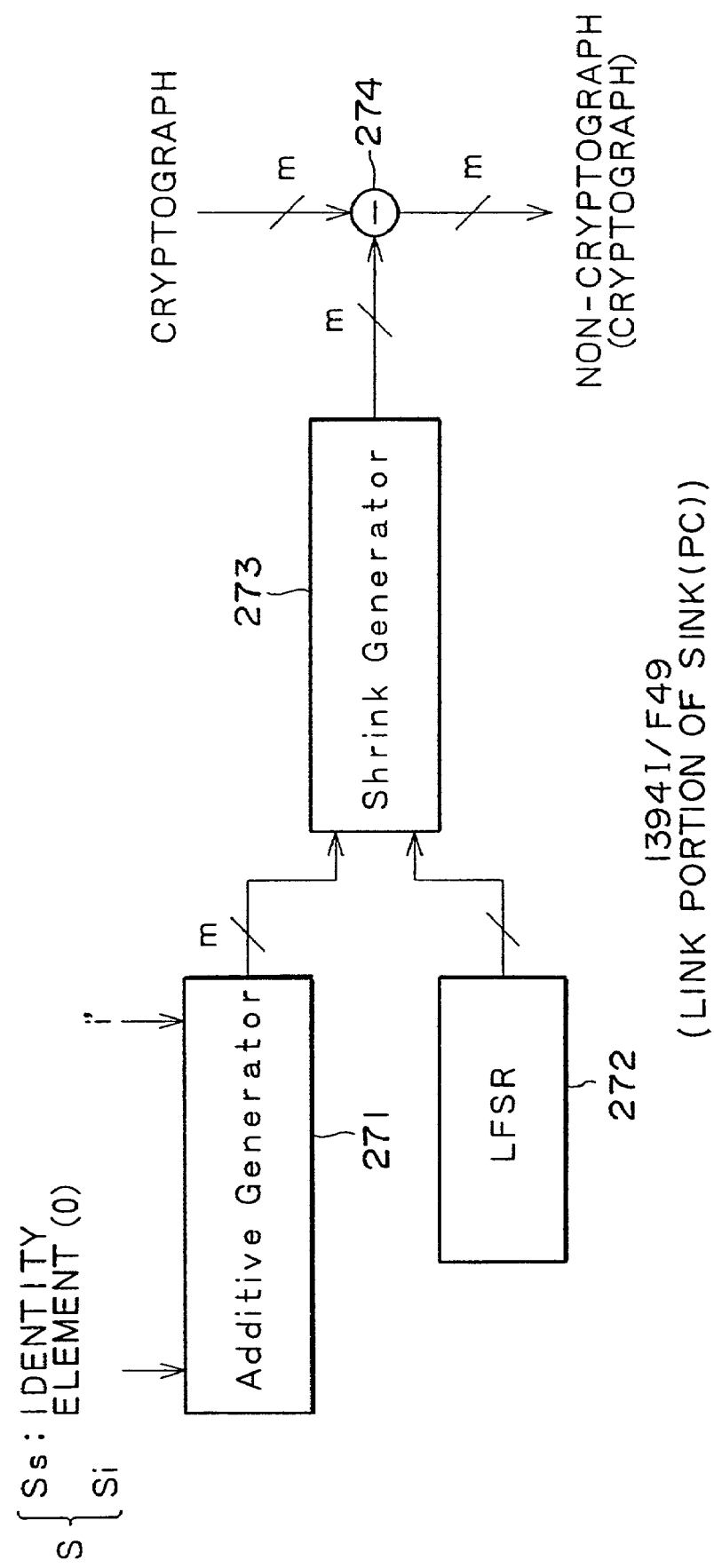
FIG. 17 is a block diagram showing an example of a construction of a 1394 interface used in the enciphering procedure of FIG. 10.

FIG. 17 shows an exemplary construction of the 1394 interface 49 where decipherment is performed by hardware. Referring to FIG. 17, the 1394 interface 49 shown has a basic construction similar to that of the 1394 interface 36 shown in FIG. 15. In particular, also the present 1394 interface 49 is composed of an additive generator 271, a linear feedback shift register 272, a shrink generator 273 and a subtractor 274, and those components have basically similar constructions to those of the additive generator 171, linear feedback shift register 172, shrink generator 173 and subtractor 174 shown in FIG. 15, respectively. However, while, in the 1394 interface shown in FIG. 17, similar keys to those of the 1394 interface 36 shown in FIG. 15 are supplied as the key i' to be for production of the time variable key i and the disturbance key Si of the session key S for disturbing the time variable key i from the license manager 62 to the additive generator 271, as the initial value key Ss, an identity element wherein all bits are 0 is supplied.

Figure 18:
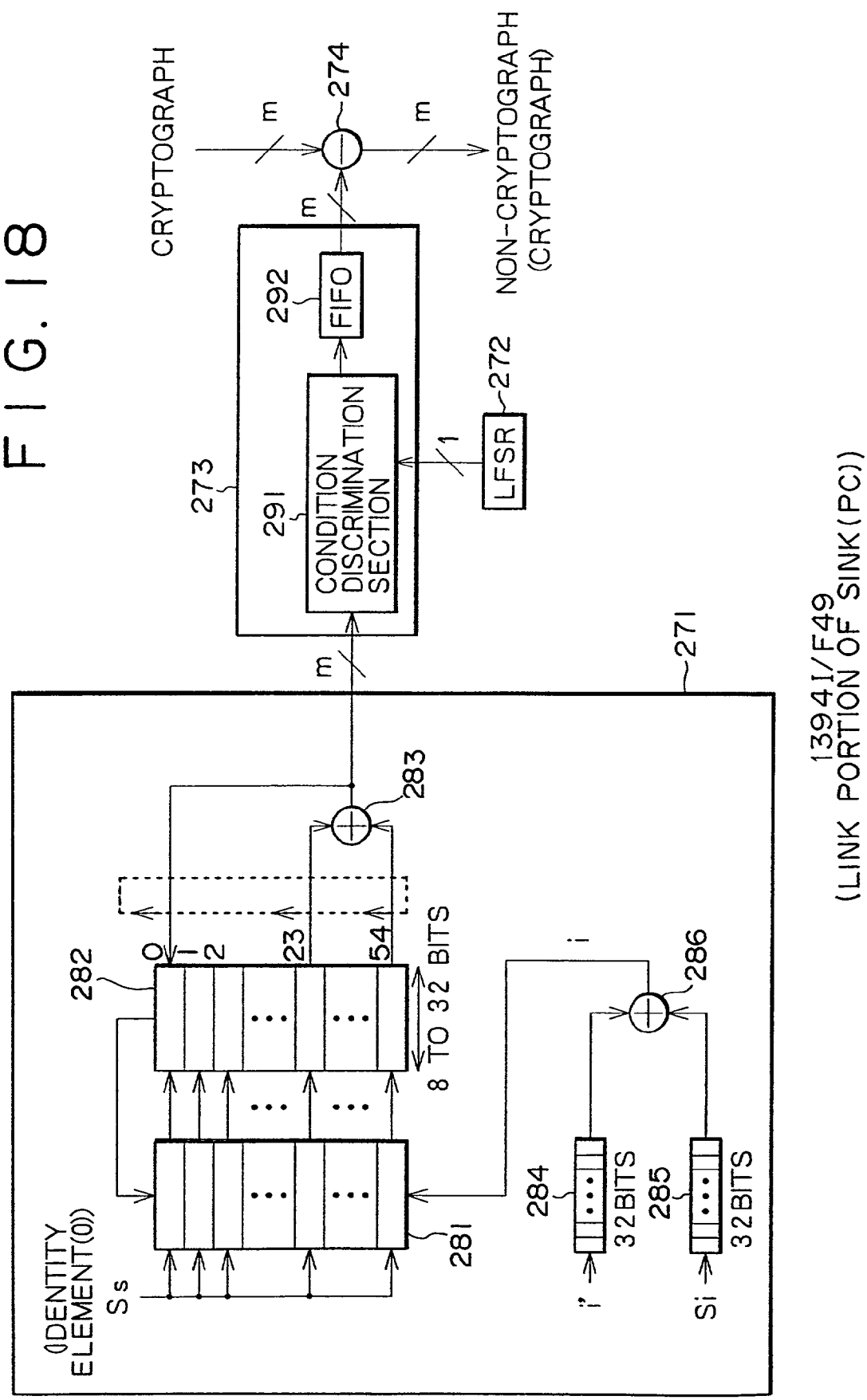
FIG. 18 is a block diagram showing an example of a more detailed construction of the 1394 interface of FIG. 17.

In particular, as shown in FIG. 18, since all of the bits of the initial value key Ss are 0, substantially similarly to the alternative case wherein no initial value key Ss is present, a cryptographic key is produced based only on the time variable key i. As a result, the subtractor 274 performs only decipherment based on the time variable key i of a cryptograph. Further, since decipherment based on the initial value key Ss is not performed, data obtained as a result of the decipherment does not make a complete non-cryptograph, but remains in a condition of a cryptograph. Accordingly, even if the data is fetched from the internal bus 51 and recorded onto the hard disk 47 or some other recording medium, it cannot be utilized as it is.

Figure 19:
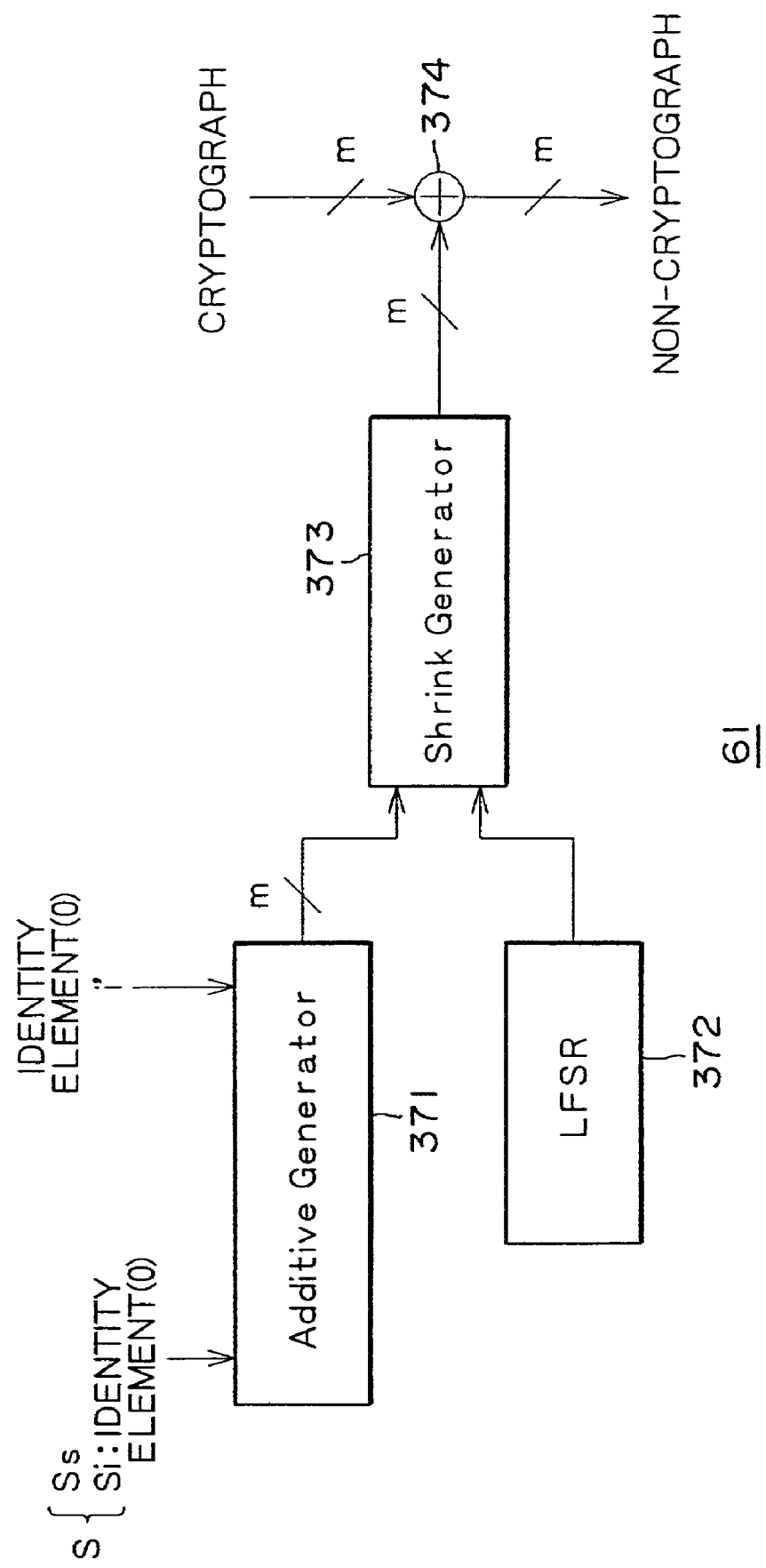
FIG. 19 is a block diagram showing an example of a construction of an application section used in the enciphering procedure of FIG. 10.

Then, the construction of the application section 61 which deciphers data deciphered once based on the time variable key i by hardware in the 1394 interface 49 in such a manner as described above further by software is composed of, as shown in FIG. 19, an additive generator 371, a linear feedback shift register 372, a shrink generator 373 and a subtractor 374. The basic constructions of the components are similar to those of the additive generator 171, linear feedback shift register 172, shrink generator 173 and subtractor 174 shown in FIG. 15, respectively.

However, while, as the initial value key Ss of the session key S, an ordinary initial value key is supplied in a similar manner as in the case of FIG. 15, each of the disturbance key Si and the key i' to be used for production of the time variable key i is data of an identity element wherein all bits are 0.

Figure 20:
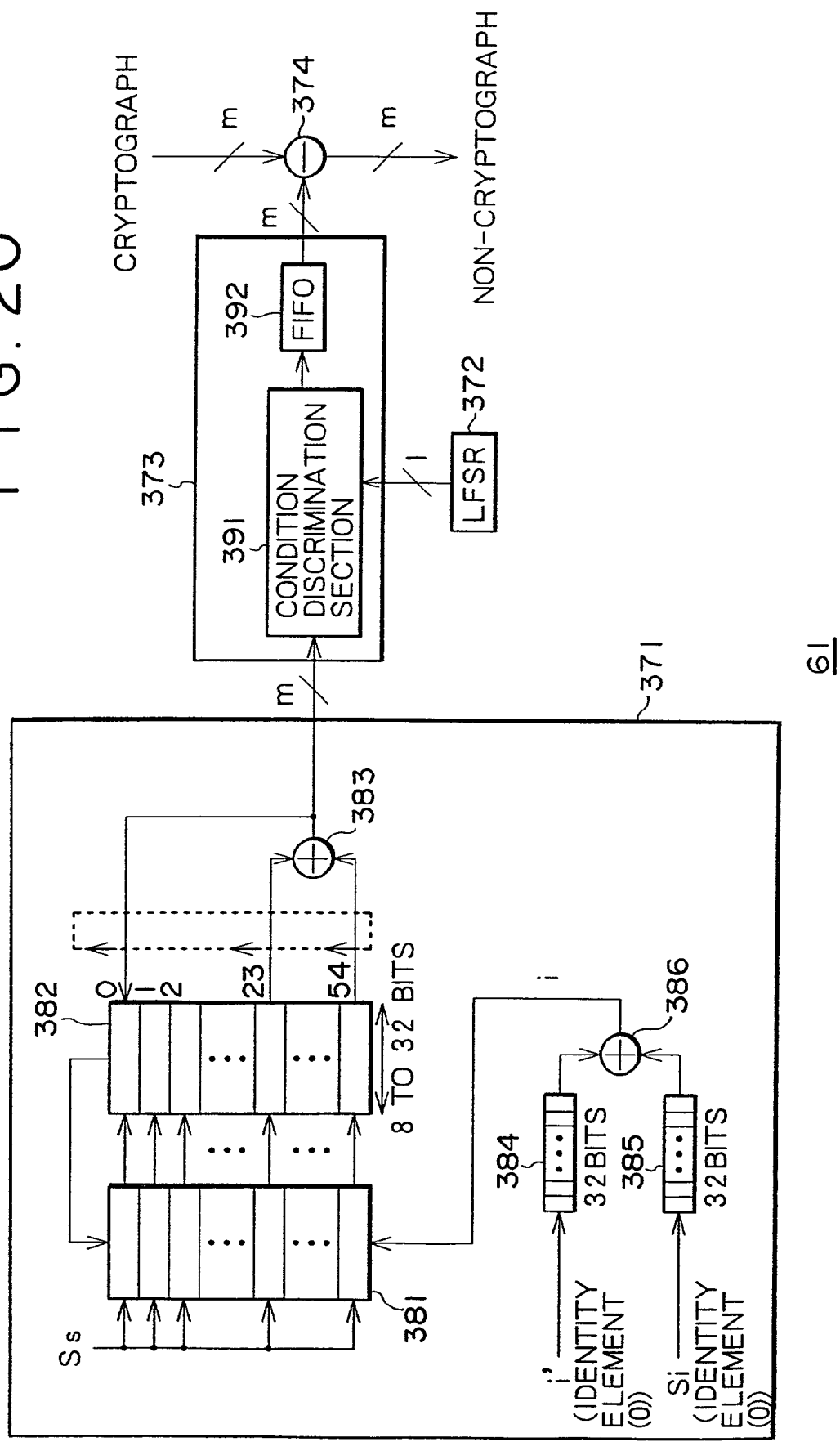
FIG. 20 is a block diagram showing an example of a more detailed construction of the application section of FIG. 19.

As a result, as particularly shown in FIG. 20 (the elements 371 to 392 correspond to the elements 171 to 192 shown in FIG. 16, respectively), since the key i' stored in the register 384 and the disturbance key Si stored in the register 385 are 0 at all bits thereof, also the time variable key i outputted from the adder 386 is 0 at all bits, and operation substantially similar to that of the alternative case wherein the time variable key i is not present is performed. In other words, a cryptographic key based only on the initial value key Ss is produced. Then, by the subtractor 374, a cryptograph is deciphered into a non-cryptograph based on the cryptographic key produced in such a manner as described above. Since this cryptograph has been obtained by the decipherment in the first stage based on the time variable key i by the 1394 interface 49 as described above, a complete non-cryptograph can be obtained by performing decipherment in the second stage based on the initial value key Ss here.

In the magneto-optical disk apparatus 3, when a cryptograph is deciphered in such a manner as described above, the CPU 31 supplies the deciphered data to the drive 35 so that it may be recorded onto a magneto-optical disk.

Meanwhile, in the personal computer 2, the CPU 41 (application section 61) supplies the data deciphered in such a manner as described above, for example, to the hard disk drive 47 so as to be recorded. In the personal computer 2, while a predetermined board can be connected as the extended board 48 to monitor data communicated by the internal bus 51, since the element which can finally decipher data transmitted to the internal bus 51 is the application section 61, even if the extended board 48 can monitor the data for which the decipherment based on the time variable key i has been performed by the 1394 interface 49 (the data for which decipherment based on the session key S has not been performed as yet), data deciphered completely to a non-cryptograph cannot be monitored. Therefore, illegal copying can be prevented.

It is to be noted that common possession of a session key may be performed using, for example, the Diffie-Hellman method or the like.

It is to be note that, in some other case such as, for example, where the 1394 interface 49 or the application section 61 of the personal computer 2 has such a comparatively low processing capacity that it cannot perform deciphering processing, if one or both of the session key and the time variable key are formed from an identity element on the source side while they are used with the identity element also on the sink side, then communication of data is possible substantially without using the session key and the time variable key. However, where this method is employed, the possibility that data may be illegally copied increases.

If the application section 61 itself originates from illegal copying, then there is the possibility that deciphered data may be copied illegally. However, this can be prevented if the application section 61 is authenticated by the license manager 62 in such a manner as described above.

As the authentication method in this instance, in addition to a common key cryptography, a digital autograph for which a public key cryptography is used can be utilized.

The 1394 interfaces shown in FIGS. 11, 12 and 15 to 20 described above satisfy a relationship of a homomorphism (homomorphism). In particular, when keys $K_1$ and $K_2$ are elements of a Galois field G, a result $K_1 \cdot K_2$ of a group operation of them makes an element of the Galois field G. Further, the following expression is satisfied with regard to a predetermined function H:

$$H(K_1 \cdot K_2) = H(K_1) \cdot H(K_2)$$

Figure 21:
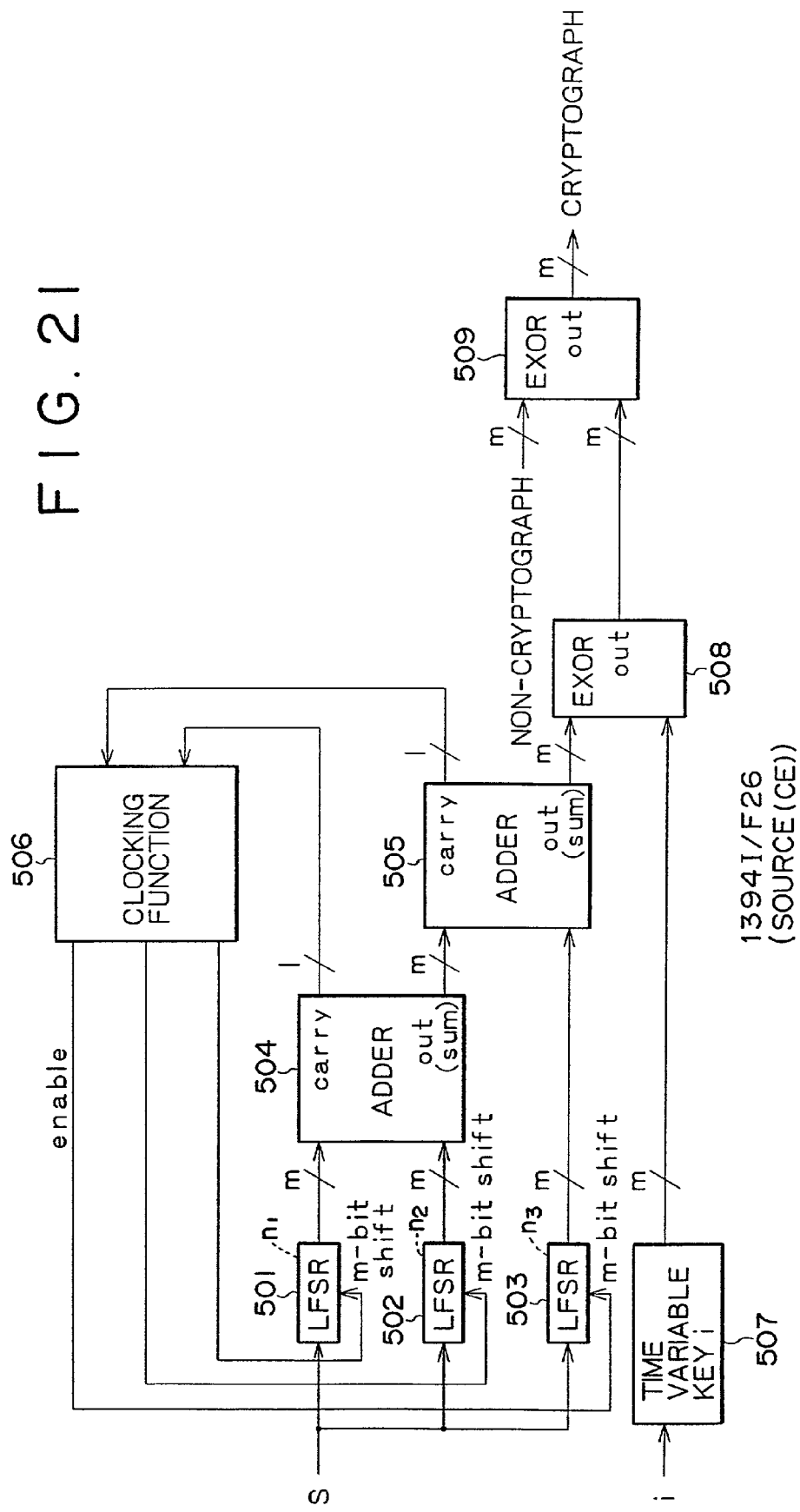
FIG. 21 is a block diagram showing another example of the construction of the 1394 interface used in the enciphering procedure of FIG. 10.

FIG. 21 shows a further exemplary construction of the 1394 interface 26. In the 1394 interface 26, a session key S is supplied to linear feedback shift registers 501 to 503 so that initialization is performed with it. The widths $n_1$ to $n_3$ of the linear feedback shift registers 501 to 503 are individually approximately 20 bits, and the individual widths $n_1$ to $n_3$ are constructed so as to be relatively prime. Accordingly, for example, of the session key S, for example, the upper $n_1$ bits are initially set to the linear feedback shift register 501, and the next upper $n_2$ bits are initially set to the linear feedback shift register 502 while the further next upper $n_3$ bits are initially set to the linear feedback shift register 503.

Each of the linear feedback shift registers 501 to 503 performs a shifting operation by m bits when an enable signal of, for example, the logical value 1 is inputted from a clocking function 506, and outputs data of m bits. The value of m may be, for example, 8, 16, 32, 40 or the like.

Outputs of the linear feedback shift register 501 and the linear feedback shift register 502 are inputted to an adder 504, by which they are added. Of the addition value of the adder 504, a carry component is supplied to the clocking function 506 while a sum component is supplied to an adder 505, by which it is added to an output of the linear feedback shift register 503. A carry component of the adder 505 is supplied to the clocking function 506 while a sum component is supplied to an exclusive OR circuit 508.

The clocking function 506 outputs, since the combination of the data supplied from the adder 504 and the adder 505 is one of 00, 01, 10 and 11, data of one of 000 to 111 in accordance with the combination of the data to the linear feedback shift registers 501 to 503. Each of the linear feedback shift registers 501 to 503 performs a shifting operation of m bits and outputs new data of m bits when the logical value 1 is inputted, but when the logical value 0 is inputted, it outputs data of m bits same as that outputted in the preceding cycle.

The exclusive OR circuit 508 operates exclusive ORing of the sum component outputted from the adder 505 and a time variable key i stored in a register 507 and outputs a result of the calculation to an exclusive OR circuit 509. The exclusive OR circuit 509 operates exclusive ORing of a non-cryptograph inputted and the cryptographic key inputted from the exclusive OR circuit 508 and outputs a result of the calculation as a cryptograph.

Figure 22:
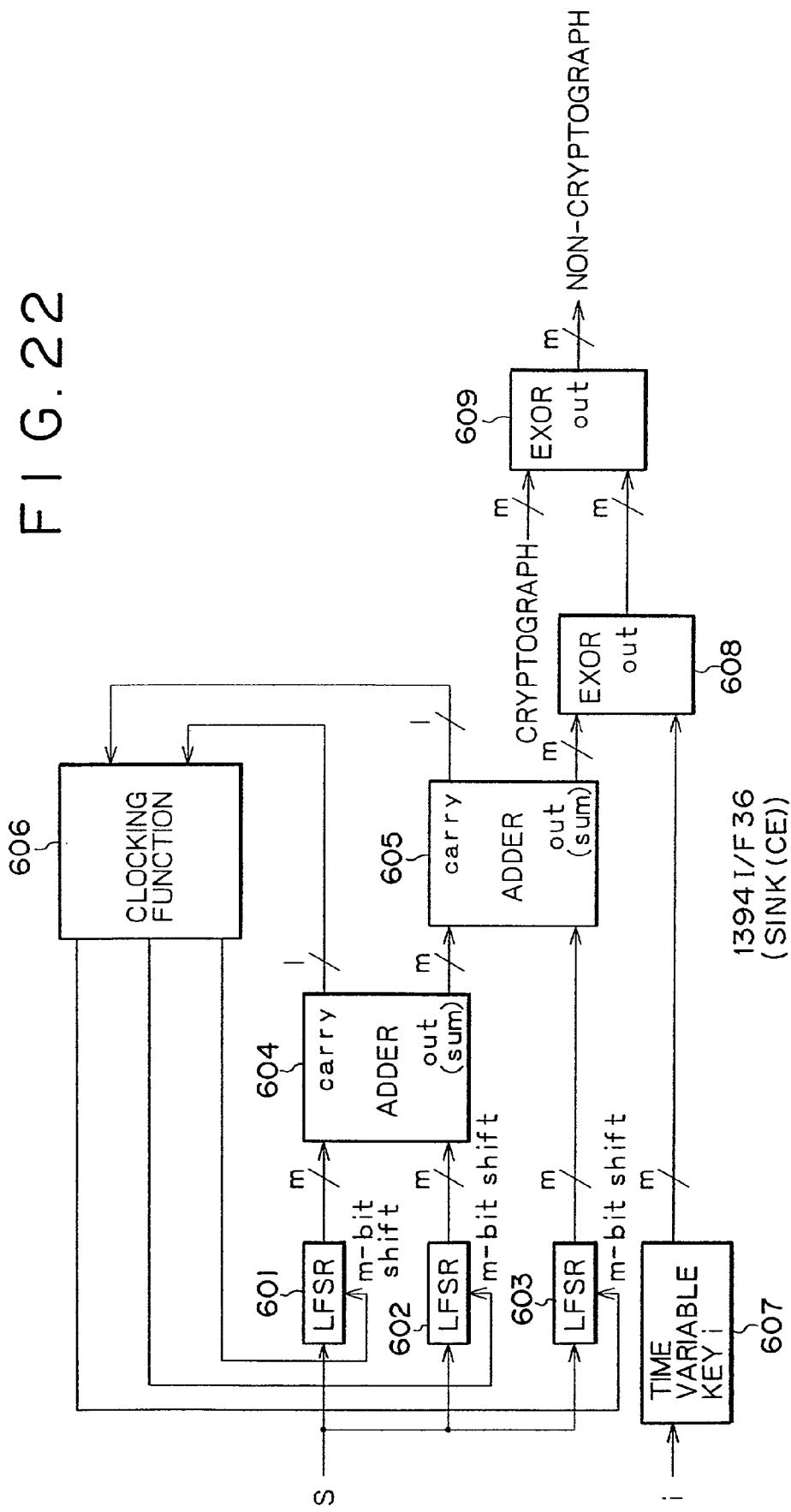
FIG. 22 is a block diagram showing another example of the construction of the 1394 interface used in the enciphering procedure of FIG. 10.

FIG. 22 shows another exemplary construction of the 1394 interface 36 of the magneto-optical disk apparatus 3. Referring to FIG. 22, the 1394 interface 36 shown includes elements 601 to 609 which are similar to the elements 501 to 509 described hereinabove with reference to FIG. 21, respectively. Therefor, overlapping description of the similar components is omitted here to avoid redundancy. The 1394 interface 36 of FIG. 22, however, is different from the 1394 interface 26 of FIG. 21 in that, while, in the 1394 interface 26, enciphering processing is performed, deciphering processing is performed in the 1394 interface 36.

Figure 23:
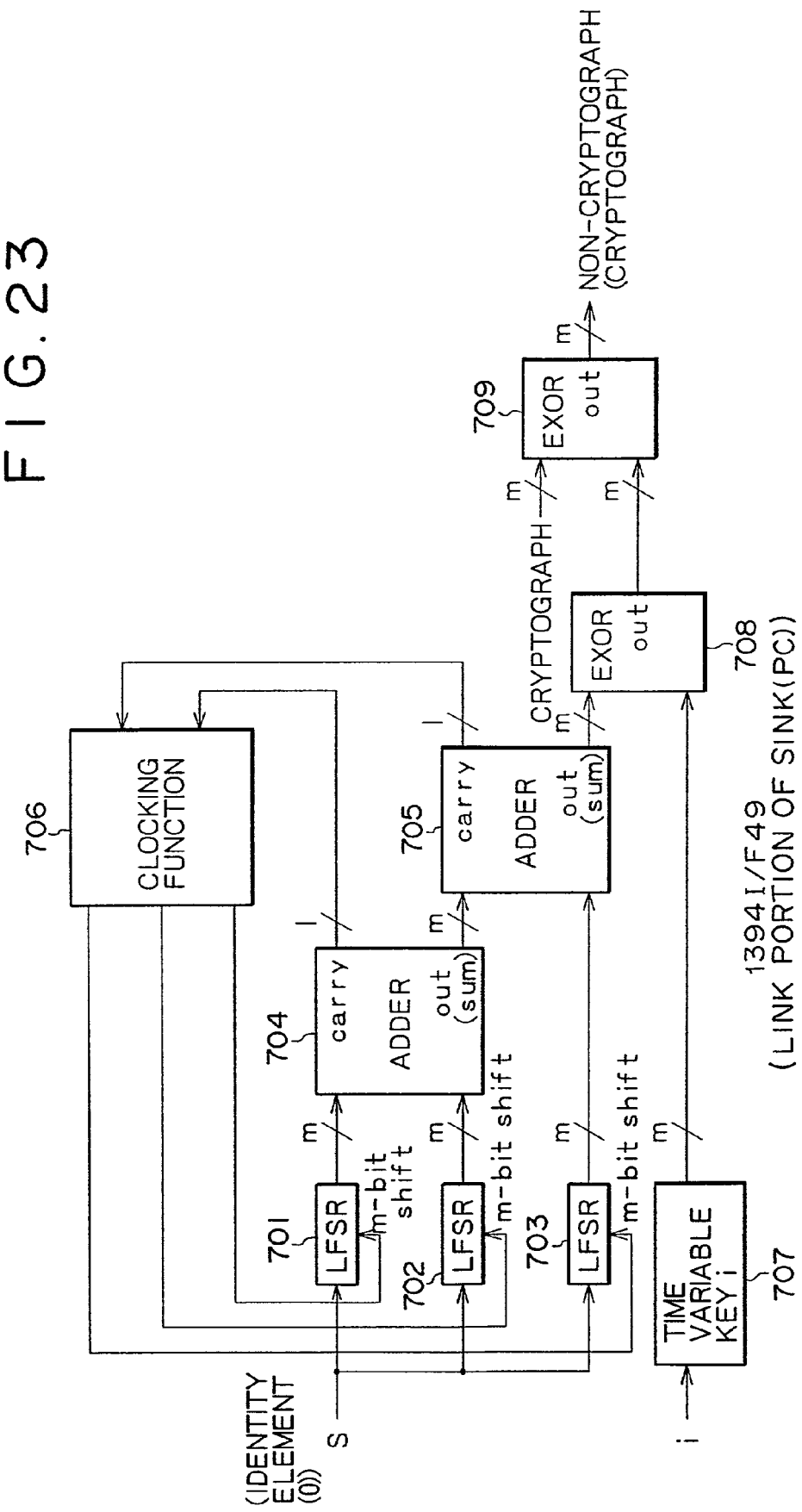
FIG. 23 is a block diagram showing another example of the construction of the 1394 interface used in the enciphering procedure of FIG. 10.

FIG. 23 shows another exemplary construction of the 1394 interface 49 of the magneto-optical disk apparatus 3. Referring to FIG. 23, the 1394 interface 36 shown includes elements 701 to 709 which are similar to the elements 601 to 609 described hereinabove with reference to FIG. 22, respectively. However, the session key S initially set to the linear feedback shift registers 701 to 703 is an identify element wherein all bits are 0. Accordingly, in the present instance, deciphering processing is performed substantially only with the time variable key i stored in the register 707.

FIG. 24 shows an exemplary construction of the application section 61 of the personal computer 2. Referring to FIG. 24, the application section 61 shown includes elements 801 to 809 which have basically similar constructions to those of the elements 601 to 609 described hereinabove with reference to FIG. 22, respectively. The application section 61 is different from the 1394 interface 36 of FIG. 22 only in that the time variable key i to be inputted to the register 807 is an identity element wherein all bits are 0. Accordingly, in the application section 61, a cryptographic key is produced and deciphering processing is performed based only on the session key S.

It is to be noted that, since the processing illustrated in FIGS. 19, 20 and 24 is performed by the application section 61, it is processed by software.

While, in the foregoing description, the DVD player 1 serves as a source and the personal computer 2 and the magneto-optical disk apparatus 3 serve as sinks, any apparatus can serve as a source or a sink.

Further, also the external bus for interconnecting the different apparatus is not limited to the 1394 bus, but various buses can be utilized, and also the electronic apparatus to be connected to the external bus are not limited to those described above, but an arbitrary apparatus can be connected.

Having now fully described the invention, it will be apparent to one of ordinary skill in the art that many changes and modifications can be made thereto without departing from the spirit and scope of the invention as set forth herein.

What is claimed is:

1. An enciphering apparatus for enciphering data using a cryptographic key, comprising:
    first providing means for providing first information;
    second providing means for providing second information which is changed during a session;
    producing means for producing a cryptographic key based on the first information and the second information; and
    enciphering means for enciphering data using said cryptographic key, wherein said cryptographic key is changed at a predetermined timing during the session in accordance with a change in said second information; and
    wherein said producing means produces a homomorphic cryptographic key.

2. An enciphering apparatus for enciphering data using a cryptographic key, comprising:
    first providing means for providing first information;
    second providing means for providing second information which is changed during a session;
    producing means for producing a cryptographic key based on the first information and the second information; and enciphering means for enciphering data using said cryptographic key, wherein said cryptographic key is changed at a predetermined tuning during the session in accordance with a change in said second information; and wherein said producing means produces said cryptographic key with which a correct decipherment result is obtained even if the first information and the second information which are used to generate said cryptographic key are used individually to successively decipher the enciphered data.

3. An enciphering apparatus for enciphering data using a cryptographic key, comprising:
first providing means for providing first information;
second providing means for providing second information which is changed during a session;
producing means for producing a cryptographic key based on the first information and the second information; and
enciphering means for enciphering data using said cryptographic key, wherein said cryptographic key is changed at a predetermined timing during the session in accordance with a change in said second information; and
wherein said producing means adds the second information to a value whose initial value is the first information to produce the cryptographic key.

4. An enciphering apparatus according to claim 3, wherein the first information has a number of bits larger than that of the second information, and said producing means adds the second information to bits at predetermined positions of the first information, extracts a bit at a predetermined position of a result of the addition and further adds the extracted bit to produce the cryptographic key.

5. An enciphering apparatus according to claim 4, wherein said producing means further updates the predetermined bits of the result of the addition with a result of the further addition of the extracted bit.

6. An enciphering apparatus according to claim 5, wherein said producing means selects predetermined bits from a result of the further addition of the extracted bits further at a predetermined timing to produce the cryptographic key.

7. A deciphering apparatus for deciphering data using a cryptographic key, comprising:
receiving means for receiving enciphered data;
first providing means for providing first information;
second providing means for providing second information which is changed during a session;
producing means for producing a cryptographic key based upon the first information and the second information; and
deciphering means for deciphering said received enciphered data using said cryptographic key, wherein said cryptographic key is changed at a predetermined timing during the session in accordance with a change in said second information and
wherein said producing means includes first producing means for producing a first cryptographic key based upon one of the first information and the second information, and second producing means for producing a second cryptographic key based upon the other of the first information and the second information, and said deciphering means includes first deciphering means for deciphering the enciphered data based upon the first cryptographic key, and second deciphering means for deciphering the data deciphered by said first deciphering means further based upon the second cryptographic key.

8. A deciphering apparatus according to claim 7, wherein said second deciphering means is formed from application software for processing the deciphered data.

9. An information processing apparatus, comprising:
receiving means for receiving enciphered data transmitted thereto through a bus;
producing means composed of a software program for producing a first cryptographic key and a second cryptographic key based upon first information and second information which is changed during a predetermined session;
first deciphering means for deciphering the enciphered data received by said receiving means using one of the first cryptographic key and the second cryptographic key produced by said producing means; and
second deciphering means for deciphering and processing the data deciphered by said first deciphering means further using the other of the first cryptographic key and the second cryptographic key produced by said producing means, wherein said second cryptographic key is changed while said data is being deciphered.

10. An information processing method, comprising the steps of:
receiving enciphered data transmitted thereto through a bus;
producing, from the received data, a first cryptographic key, and a second cryptographic key based upon first information and second information which is changed during a session;
deciphering the received enciphered data using one of the first cryptographic key and the second cryptographic key; and
deciphering the deciphered data further using the other of the first cryptographic key and the second cryptographic key, wherein said second cryptographic key is changed while said data is being deciphered.

11. The enciphering apparatus for enciphering data using a cryptographic key, comprising:
an encipherer;
a first information provider coupled with said encipherer;
a second information provider coupled with said encipherer; and
a cryptographic key producer coupled with said encipherer, whereby said encipherer enciphers data using a cryptographic key produced by said cryptographic key producer based upon first information provided by said first information provider and second information provided by said second information provider and changed at a predetermined timing during a session and
wherein said cryptographic key producer produces a homomorphic cryptographic key.

12. The enciphering apparatus for enciphering data using a cryptographic key, comprising:
an encipherer;
a first information provider coupled with said encipherer;
a second information provider coupled with said encipherer; and
a cryptographic key producer coupled with said encipherer, whereby said encipherer enciphers data using a cryptographic key produced by said cryptographic key producer based upon first information provided by said first information provider and second information provided by said second information provider and changed at a predetermined timing during a session and
wherein said cryptographic key producer produces said cryptographic key with which a correct decipherment result is obtained even if the first information and the second information on which the cryptographic key is based are used individually to successively decipher the enciphered data.

13. The enciphering apparatus for enciphering data using a cryptographic key, comprising:
   an encipherer;
   a first information provider coupled with said encipherer;
   a second information provider coupled with said encipherer; and
   a cryptographic key producer coupled with said encipherer, whereby said encipherer enciphers data using a cryptographic key produced by said cryptographic key producer based upon first information provided by said first information provider and second information provided by said second information provider and changed at a predetermined timing during a session and
   wherein said cryptographic key producer adds the second information to a value whose initial value is the first information to produce the cryptographic key.

14. The enciphering apparatus according to claim 13, wherein the first information has a number of bits larger than that of the second information, and said cryptographic key producer adds the second information to bits at predetermined positions of the first information, extracts a bit at a predetermined position of a result of the addition and further adds the extracted bit to produce the cryptographic key.

15. The enciphering apparatus according to claim 14, wherein said cryptographic key producer further updates the result of the addition with the further addition of the extracted bit.

16. The enciphering apparatus according to claim 15, wherein said cryptographic key producer selects predetermined bits from a result of the further addition of the extracted bits at a predetermined timing to produce the cryptographic key.

17. The deciphering apparatus for deciphering data using a cryptographic key, comprising:
   a receiver;
   a decipherer coupled with said receiver;
   a first information provider coupled with said decipherer;
   a second information provider coupled with said decipherer; and
   a cryptographic key producer coupled with said decipherer, whereby said decipherer deciphers data received by said receiver using a cryptographic key produced by said cryptographic key producer based upon first information provided by said first information provider and second information provided by said second information provider and changed at a predetermined timing during a session,
   wherein said cryptographic key producer includes a first cryptographic key producer coupled with said first and second information providers for producing a first cryptographic key using one of the first information and the second information, and a second cryptographic key producer coupled with said first and second information providers and said first cryptographic key producer for producing a second cryptographic key using the other of the first information and the second information, and said decipherer includes a first deciphering section and a second deciphering section, said first deciphering section deciphering the enciphered data using the first cryptographic key, and said second deciphering section deciphering the data deciphered by said first deciphering section using the second cryptographic key.

18. The deciphering apparatus according to claim 17, wherein said second deciphering section is formed from application software for processing the deciphered data.

19. An enciphering method for enciphering data using a cryptographic key, comprising the steps of:
   providing first information;
   providing second information which is changed during a session;
   producing a cryptographic key based upon the first information and the second information; and
   enciphering data using said cryptographic key, wherein said cryptographic key is changed at a predetermined timing during a session in accordance with a change in said second information and
   wherein a homomorphic cryptographic key is produced.

20. An enciphering method for enciphering data using a cryptographic key, comprising the steps of:
   providing first information;
   providing second information which is changed during a session;
   producing a cryptographic key based upon the first information and the second information; and
   enciphering data using said cryptographic key, wherein said cryptographic key is changed at a predetermined timing during a session in accordance with a change in said second information and
   wherein said cryptographic key is produced with which a correct decipherment result is obtained even if the first information and the second information which compose the cryptographic key are used individually to successively decipher the enciphered data.

21. An enciphering method for enciphering data using a cryptographic key, comprising the steps of:
   providing first information;
   providing second information which is changed during a session;
   producing a cryptographic key based upon the first information and the second information; and
   enciphering data using said cryptographic key, wherein said cryptographic key is changed at a predetermined timing during a session in accordance with a change in said second information and
   wherein the second information is added to a value whose initial value is the first information to produce the cryptographic key.

22. An enciphering method according to claim 21, wherein the first information has a number of bits larger than that of the second information, and the second information is added to bits at predetermined positions of the first information, a bit at a predetermined position of a result of the addition is extracted and the extracted bit is further added to produce the cryptographic key.

23. An enciphering method according to claim 22, wherein the predetermined bits of the result of the addition are updated with a result of the further addition of the extracted bit.

24. An enciphering method according to claim 23, wherein predetermined bits are selected from a result of the further addition of the extracted bits further at a predetermined timing to produce the cryptographic key.

25. A deciphering method for deciphering data using a cryptographic key, comprising the steps of:
   receiving enciphered data;
   providing first information;
   providing second information which is changed during a session;

producing a cryptographic key based upon the first information and the second information; and deciphering said received enciphered data using said cryptographic key, wherein said cryptographic key is changed at a predetermined timing during a session in accordance with a change in said second information and wherein a first cryptographic key is produced using one of the first information and the second information, and a second cryptographic key is produced using the other of the first information and the second information, and the enciphered data is first deciphered using the first cryptographic key, the data deciphered using the first cryptographic key is further deciphered using the second cryptographic key.

26. A deciphering apparatus according to claim 25, wherein deciphering using said second cryptographic key is performed by application software for processing the deciphered data.

27. An enciphering apparatus for enciphering data using a cryptographic key, comprising:
first providing means for providing first information which is held in common with another device in an authentication process by communication between the two devices;
second providing means for providing second information which is changed at a predetermined timing;
producing means for producing the cryptographic key based on the first information held in common with the other device and the second information which is used for changing the crytographic key; and
enciphering means for enciphering data using said cryptographic key, wherein said cryptographic key is changed at a predetermined timing in accordance with a change in said second information and
wherein said producing means produces a homomorphic cryptographic key.

28. An enciphering apparatus for enciphering data using a cryptographic key, comprising:
first providing means for providing first information which is held in common with another device in an authentication process by communication between the two devices;
second providing means for providing second information which is changed at a predetermined timing;
producing means for producing the cryptographic key based on the first information held in common with the other device and the second information which is used for changing the cryptographic key; and
enciphering means for enciphering data using said cryptographic key, wherein said cryptographic key is changed at a predetermined timing in accordance with a change in said second information and
wherein said producing means produces said cryptographic key with which a correct decipherment result is obtained even if the first information and the second information which are used to generate said cryptographic key are used individually to successively decipher the enciphered data.

29. An enciphering apparatus for enciphering data using a cryptographic key, comprising:
first providing means for providing first information which is held in common with another device in an authentication process by communication between the two devices;
second providing means for providing second information which is changed at a predetennined timing;
producing means for producing the cryptographic key based on the first information held in common with the other device and the second information which is used for changing the cryptographic key; and
enciphering means for enciphering data using said cryptographic key, wherein said cryptographic key is changed at a predetermined timing in accordance with a change in said second information and
wherein said producing means adds the second information to a value whose initial value is the first information to produce the cryptographic key.

30. An enciphering apparatus according to claim 29, wherein the first information has a number of bits larger than that of the second information, and said producing means adds the second information to bits at predetermined positions of the first information, extracts a bit at a predetermined position of a result of the addition and further adds the extracted bit to produce the cryptographic key.

31. An enciphering apparatus according to claim 30, wherein said producing means further updates the predetermined bits of the result of the addition with a result of the further addition of the extracted bit.

32. An enciphering apparatus according to claim 31, wherein said producing means selects predetermined bits from a result of the further addition of the extracted bits further at a predetermined timing to produce the cryptographic key.

33. A deciphering apparatus for deciphering data using a cryptographic key, comprising:
receiving means for receiving enciphered data;
first providing means for providing first information which is held in common with another device in an authentication process by communication between the two devices;
second providing means for providing second information which is changed at a predetermined timing;
producing means for producing a cryptographic key based upon the first information held in common with the other device and the second information which is used for changing the cryptographic key; and
deciphering means for deciphering said received enciphered data using said cryptographic key, wherein said cryptographic key is changed at a predetermined timing in accordance with a change in said second information and
wherein said producing means includes first producing means for producing a first cryptographic key based upon one of the first information and the second information, and second producing means for producing a second cryptographic key based upon the other of the first information and the second information, and said deciphering means includes first deciphering means for deciphering the enciphered data based upon the first cryptographic key, and second deciphering means for deciphering the data deciphered by said first deciphering means further based upon the second cryptographic key.

34. A deciphering apparatus according to claim 33, wherein said second deciphering means is formed from application software for processing the deciphered data.

35. An information processing apparatus, comprising:
receiving means for receiving enciphered data transmitted thereto through a bus;
producing means composed of a software program for producing a first cryptographic key and a second cryptographic key based upon first information which is held in common with another device in an authentication process by communication between the two devices and second information which is changed at a predetermined timing;

first deciphering means for deciphering the enciphered data received by said receiving means using one of the first cryptographic key and the second cryptographic key produced by said producing means; and second deciphering means for deciphering and processing the data deciphered by said first deciphering means further using the other of the first cryptographic key and the second cryptographic key produced by said producing means, wherein said second cryptographic key is changed in accordance with said second information at a predetermined timing.

36. An information processing method, comprising the steps of:

receiving enciphered data transmitted thereto through a bus;

producing, from the received data, a first cryptographic key, and a second cryptographic key based upon first information held in common with another device in an authentication process by communication between the two devices and second information which is changed at a predetermined timing;

deciphering the received enciphered data using one of the first cryptographic key and the second cryptographic key; and deciphering the deciphered data further using the other of the first cryptographic key and the second cryptographic key, wherein said second cryptographic key is changed in accordance with the second information at a predetermined timing.

37. An enciphering apparatus for enciphering data using a cryptographic key, comprising:

an encipherer;
a first information provider coupled with said encipherer;
a second information provider coupled with said encipherer; and
a cryptographic key producer coupled with said encipherer, whereby said encipherer enciphers data using a cryptographic key produced by said cryptographic key producer based upon first information provided by said first information provider and held in common with another device in an authentication process by communication between the two devices, and second information provided by said second information provider and changed at a predetermined timing
wherein said cryptographic key producer produces a homomorphic cryptographic key.

38. An enciphering apparatus for enciphering data using a cryptographic key, comprising:

an encipherer;
a first information provider coupled with said encipherer;
a second information provider coupled with said encipherer; and
a cryptographic key producer coupled with said encipherer, whereby said encipherer enciphers data using a cryptographic key produced by said cryptographic key producer based upon first information provided by said first information provider and held in common with another device in an authentication process by communication between the two devices, and second information provided by said second information provider and changed at a predetermined timing
wherein said cryptographic key producer produces said cryptographic key with which a correct decipherment result is obtained even if a first information and a second information which compose the cryptographic key are used individually to successively decipher the enciphered data.

39. An enciphering apparatus for enciphering data using a cryptographic key, comprising:

an encipherer;
a first information provider coupled with said encipherer;
a second information provider coupled with said encipherer; and
a cryptographic key producer coupled with said encipherer, whereby said encipherer enciphers data using a cryptographic key produced by said cryptographic key producer based upon first information provided by said first information provider and held in common with another device in an authentication process by communication between the two devices, and second information provided by said second information provider and changed at a predetermined timing,
wherein said cryptographic key producer adds the second information to a value whose initial value is the first information to produce the cryptographic key.

40. The enciphering apparatus according to claim 39, wherein the first information has a number of bits larger than that of the second information, and said cryptographic key producer adds the second information to bits at predetermined positions of the first information, extracts a bit at a predetermined position of a result of the addition and further adds the extracted bit to produce the cryptographic key.

41. The enciphering apparatus according to claim 40, wherein said cryptographic key producer further updates the result of the addition with the further addition of the extracted bit.

42. The enciphering apparatus according to claim 41, wherein said cryptographic key producer selects predetermined bits from a result of the further addition of the extracted bits at a predetermined timing to produce the cryptographic key.

43. A deciphering apparatus for deciphering data using a cryptographic key, comprising:

a receiver;
a decipherer coupled with said receiver;
a first information provider coupled with said decipherer;
a second information provider coupled with said decipherer; and
a cryptographic key producer coupled with said decipherer, whereby said decipherer deciphers data received by said receiver using a cryptographic key produced by said cryptographic key producer based upon first information provided by said first information provider and held in common with another device in an authentication device by communication between the two devices and second information provided by said second information provider and changed at a predetermined timing,
wherein said cryptographic key producer includes a first cryptographic key producer coupled with said first and second information providers for producing a first cryptographic key using one of the first information and the second information, and a second cryptographic key producer coupled with said first and second information providers and said first cryptographic key producer for producing a second cryptographic key using the other of the first information and the second information, and said decipherer includes a first deciphering section and a second deciphering section, said first deciphering section deciphering the enciphered data using the first cryptographic key, and said second deciphering section deciphering the data deciphered by said first deciphering section using the second cryptographic key.

44. The deciphering apparatus according to claim 43, wherein said second deciphering section is formed from application software for processing the deciphered data.

45. An enciphering method for enciphering data using a cryptographic key, comprising the steps of:
  providing first information which is held in common with another device in an authentication process by communication between the two devices;
  providing second information which is changed at a predetermined timing;
  producing a cryptographic key based upon the first information held in common with the other device and the second information which is used for changing the cryptographic key; and
  enciphering data using said cryptographic key, wherein said cryptographic key is changed at a predetermined timing in accordance with a change in said second information, and
  wherein a homomorphic cryptographic key is produced.

46. An enciphering method for enciphering data using a cryptographic key, comprising the steps of:
  providing first information which is held in common with another device in an authentication process by communication between the two devices;
  providing second information which is changed at a predetermined timing;
  producing a cryptographic key based upon the first information held in common with the other device and the second information which is used for changing the cryptographic key; and
  enciphering data using said cryptographic key, wherein said cryptographic key is changed at a predetermined timing in accordance with a change in said second information, and
  wherein said cryptographic key is produced with which a correct decipherment result is obtained even if the first information and the second information which compose the cryptographic key are used individually to successively decipher the enciphered data.

47. An enciphering method for enciphering data using a cryptographic key, comprising the steps of:
  providing first information which is held in common with another device in an authentication process by communication between the two devices;
  providing second information which is changed at a predetermined timing;
  producing a cryptographic key based upon the first information held in common with the other device and the second information which is used for changing the cryptographic key; and
  enciphering data using said cryptographic key, wherein said cryptographic key is changed at a predetermined timing in accordance with a change in said second information, and
  wherein the second information is added to a value whose initial value is the first information to produce the cryptographic key.

48. An enciphering method according to claim 47, wherein the first information has a number of bits larger than that of the second information, and the second information is added to bits at predetermined positions of the first information, a bit at a predetermined position of a result of the addition is extracted and the extracted bit is further added to produce the cryptographic key.

49. An enciphering method according to claim 48, wherein the predetermined bits of the result of the addition are updated with a result of the further addition of the extracted bit.

50. An enciphering method according to claim 49, wherein predetermined bits are selected from a result of the further addition of the extracted bits further at a predetermined timing to produce the cryptographic key.

51. A deciphering method for deciphering data using a cryptographic key, comprising the steps of:
  receiving enciphered data;
  providing first information which is held in common with another device in an authentication process by communication between the two devices;
  providing second information which is changed at a predetermined timing;
  producing a cryptographic key based upon the first information held in common with the other device and the second information which is used for changing the cryptographic key; and
  deciphering said received enciphered data using said cryptographic key, wherein said cryptographic key is changed at a predetermined timing in accordance with a change in said second information, and
  wherein a first cryptographic key is produced using one of the first information and the second information, and a second cryptographic key is produced using the other of the first information and the second information, and the enciphered data is first deciphered using the first cryptographic key, the data deciphered using the first cryptographic key is further deciphered using the second cryptographic key.

52. A deciphering apparatus according to claim 51, wherein deciphering using said second cryptographic key is performed by application software for processing the deciphered data.

* * * * *